(12) United States Patent
DuBois

(10) Patent No.: US 7,621,129 B2
(45) Date of Patent: Nov. 24, 2009

(54) POWER GENERATION SYSTEM

(75) Inventor: John R. DuBois, Palm Beach Gardens, FL (US)

(73) Assignee: Mine-RG, Inc., Palm Beach Gardens, FL (US)

( * ) Notice: Subject to any disclaimer, the term of this patent is extended or adjusted under 35 U.S.C. 154(b) by 84 days.

(21) Appl. No.: 12/042,116

(22) Filed: Mar. 4, 2008

(65) Prior Publication Data

US 2009/0120091 A1    May 14, 2009

Related U.S. Application Data

(63) Continuation-in-part of application No. 11/936,821, filed on Nov. 8, 2007.

(51) Int. Cl.
*F03G 7/00* (2006.01)
*F03G 7/04* (2006.01)

(52) U.S. Cl. .............. 60/641.2; 60/641.1; 60/641.3; 60/641.6

(58) Field of Classification Search .............. 60/61.1, 60/641.2, 641.3, 641.6
See application file for complete search history.

(56) References Cited

U.S. PATENT DOCUMENTS

| | | | |
|---|---|---|---|
| 3,894,393 A | 7/1975 | Carlson | |
| 3,988,896 A | 11/1976 | Matthews | |
| 3,991,817 A * | 11/1976 | Clay | 165/45 |
| 4,018,543 A * | 4/1977 | Carson et al. | 415/208.2 |
| 4,070,131 A | 1/1978 | Yen | |
| 4,106,295 A * | 8/1978 | Wood | 60/649 |
| 4,109,305 A | 8/1978 | Claussen et al. | |
| 4,157,014 A | 6/1979 | Clark, Jr. | |
| 4,297,847 A * | 11/1981 | Clayton | 60/641.3 |
| 4,453,383 A | 6/1984 | Collins | |
| 4,497,177 A | 2/1985 | Anderson | |
| 4,507,916 A | 4/1985 | Anderson | |
| 4,779,006 A * | 10/1988 | Wortham | 290/55 |
| 4,801,811 A | 1/1989 | Assaf et al. | |
| 5,047,654 A | 9/1991 | Newman | |
| 5,095,705 A | 3/1992 | Daly | |
| 5,096,467 A | 3/1992 | Matsui | |
| 5,284,628 A | 2/1994 | Prueitt | |
| 7,026,723 B2 | 4/2006 | Moreno | |
| 7,062,911 B2 * | 6/2006 | Yang | 60/641.6 |
| 7,086,823 B2 | 8/2006 | Michaud | |
| 7,132,090 B2 | 11/2006 | Dziedzic et al. | |
| 2003/0201646 A1 | 10/2003 | Kaploun | |

* cited by examiner

*Primary Examiner*—Thomas E Denion
*Assistant Examiner*—Christopher Jetton
(74) *Attorney, Agent, or Firm*—McHale & Slavin, P.A.

(57) ABSTRACT

A geothermal power system for production of power, and in particular electrical energy, utilizing naturally occurring geothermal energy sources and a method for identifying and converting manmade and natural geological formations into a substantial source of energy and at the same time providing remediation of environmental and safety hazards. Utilizing surface air that is substantially cooler than the geothermal temperature of the subterranean cavern an induced air flow will be produced. This naturally induced air flow will be harnessed and provide the energy to the system power plants for production of electrical energy. The system includes a hydro-electric power system, a geothermal well, underground farms, heat recovery systems, a source of renewable biomass material, and air and water remediation systems.

28 Claims, 17 Drawing Sheets

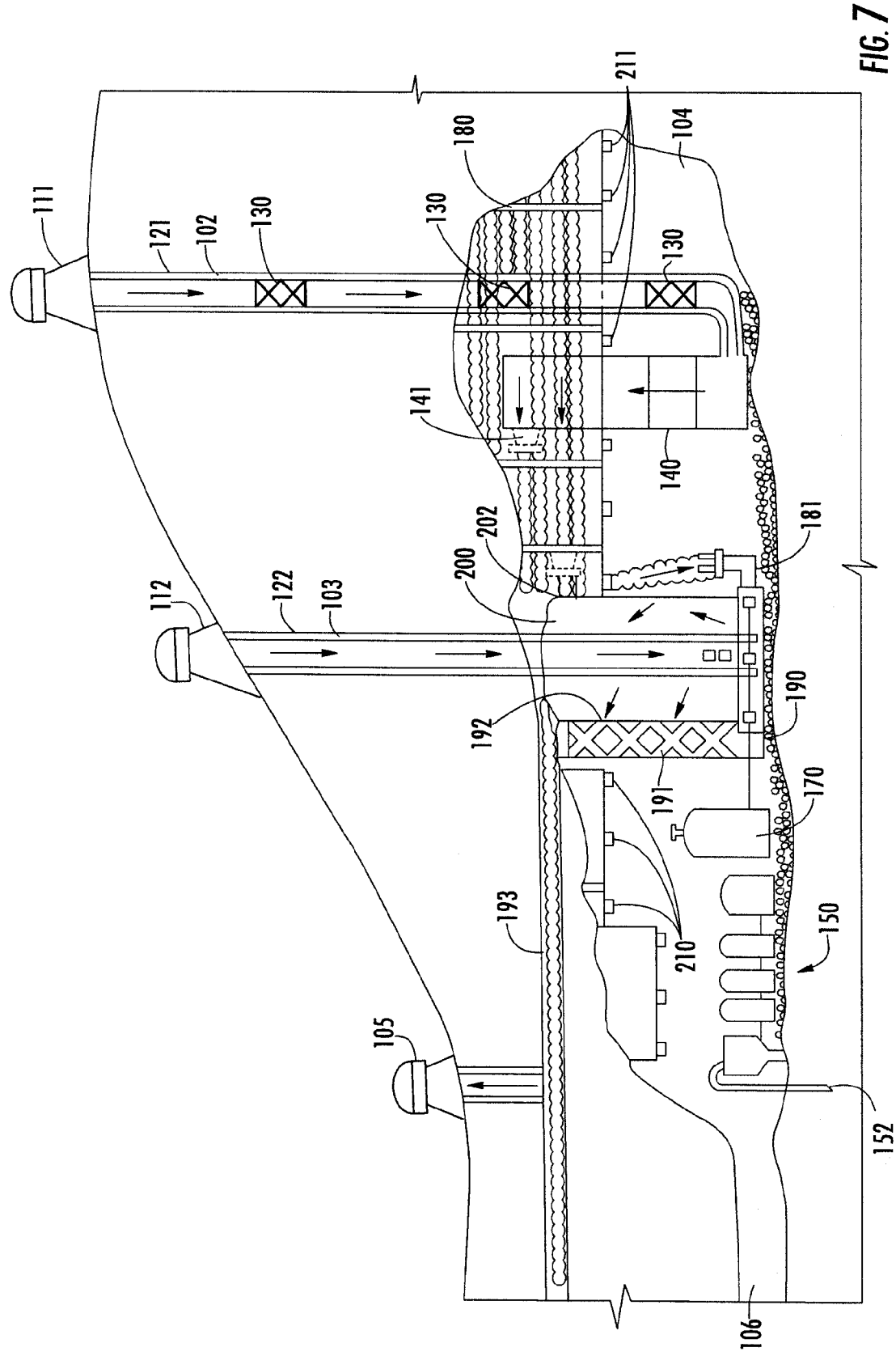

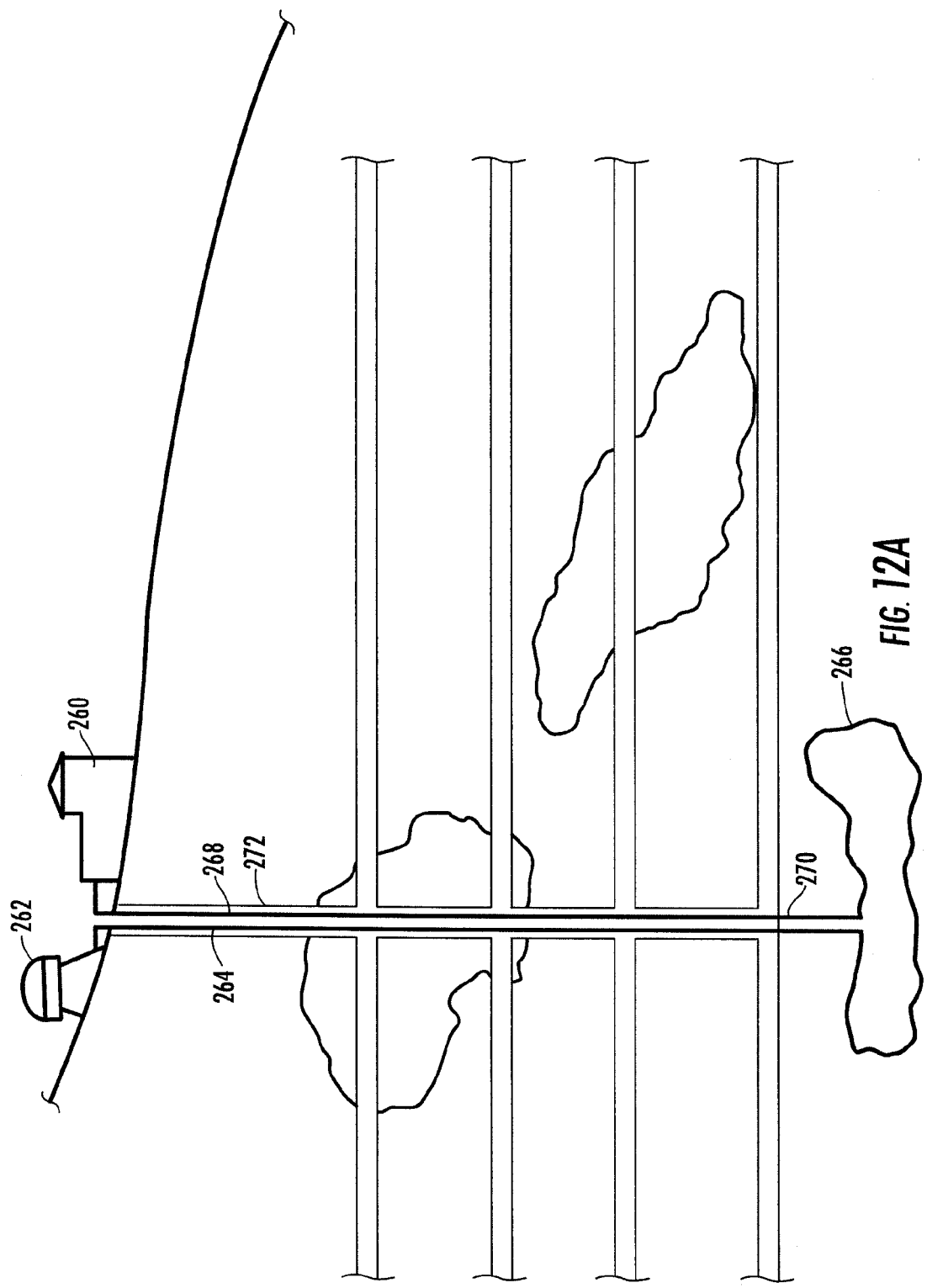

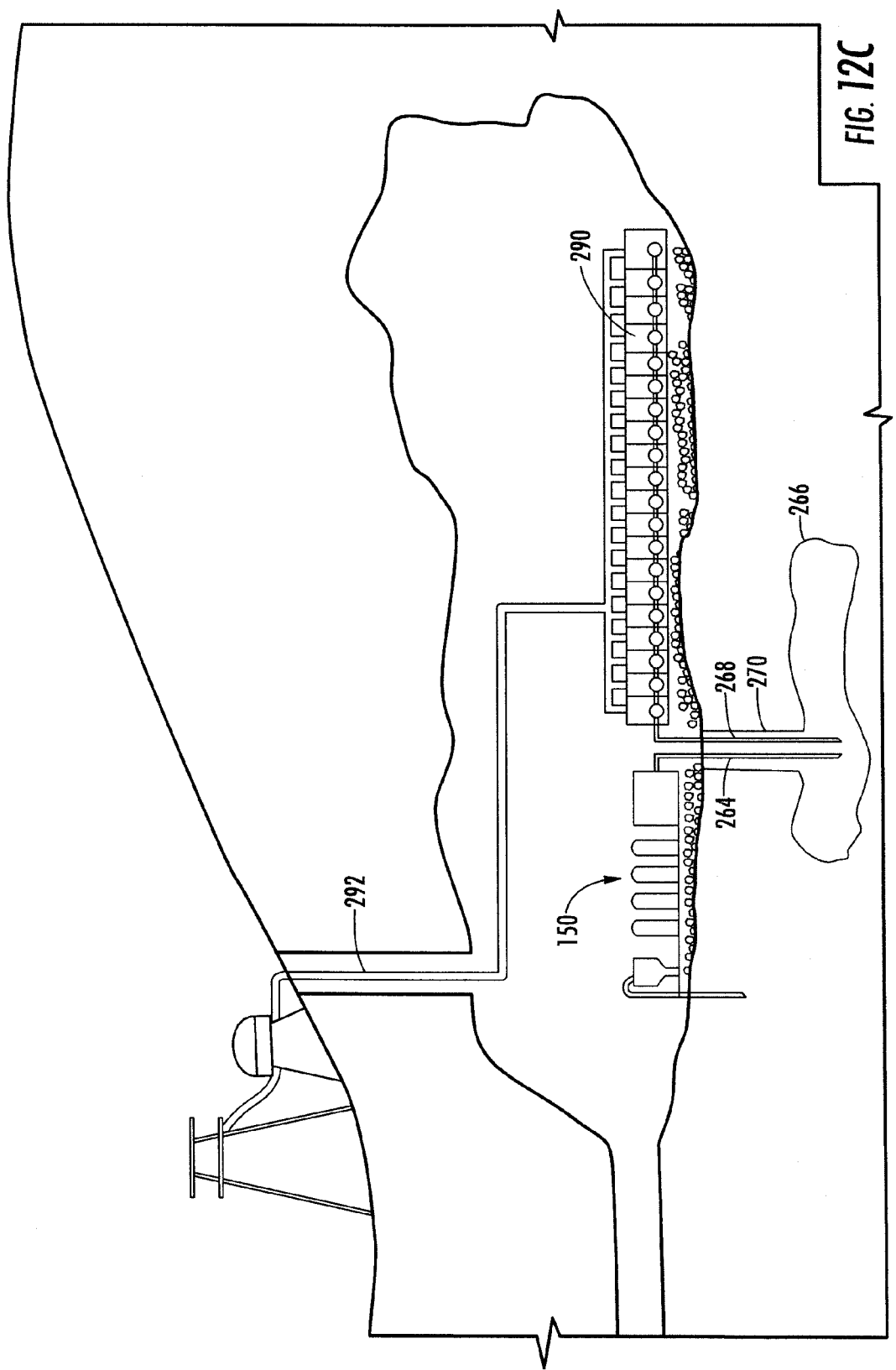

POWER GENERATION SYSTEM

PRIORITY CLAIM

This application is a continuation-in-part of application Ser. No. 11/936,821 filed Nov. 08, 2007 and entitled Geothermal Power Generation System and Method for Adapting to Mine Shafts which is hereby expressly incorporated by reference.

FIELD OF THE INVENTION

The present invention relates to a system for production of power. The invention will produce large quantities of mechanical energy from naturally occurring geothermal sources which can be converted into electrical energy.

BACKGROUND OF THE INVENTION

Geopolitical events can have dramatic repercussions on the availability of petroleum exported from the world's petroleum producing nations. It is therefore apparent that industrial as well as developing nations cannot rely on these petroleum producing countries for a consistent and reliable source of petroleum. Likewise, it is becoming increasing more difficult to locate new sources of petroleum and more and more apparent that there is only a finite quantity of easily accessible petroleum. Green house gases as well as global warming are also of critical importance when considering the impact of new power production and electrical power generation facilities. For these and other reasons as well, petroleum based combustion type power generation is very undesirable. Likewise, nuclear energy is thought of by the general public as being highly dangerous and undesirable. The vast majority of people are opposed to the new construction of nuclear facilities anywhere close to their neighborhood. In addition, the disposal of spent nuclear fuel also presents numerous problems and challenges in terms of nuclear accidents and potential acts of terrorism. Public opinion concerning nuclear power generation is therefore very negative and makes its utilization politically unacceptable.

The geothermal energy contained within the earth represents an almost infinite amount of potential energy. The ability to extract this energy in an efficient, cost effective and environmentally safe way has to date proven to be a daunting challenge. Likewise, over the course of the last several hundred years mankind has created numerous subterranean passageways through the earth for the purpose of extracting minerals, and metal ores. These mining shafts provide excellent avenues through which geothermal energy can be extracted. In addition to the current active mines there are also numerous abandoned mines located around the world. These abandoned mines are generally unmarked and unsealed from public access. An abandoned mine may well contain an open yet visually obscured hole that could descend tens if not hundreds of feet in depth. They serve no useful purpose and in fact pose a threat to the safety and well being for those who unwittingly approach the area of an abandoned mine. The conversion of an abandoned mine into a geothermal source of energy provides an efficient and cost effect way of tapping geothermal energy from the earth while at the same time providing an environmentally friendly solution to an existing public environmental hazard.

There are literally hundreds of thousands of abandoned underground mines throughout the world. Their labyrinths of vertical and horizontal shafts descend deeply into the earth, some of them thousands of feet below the surface. Once the desired ore deposits were found—gold, silver, cooper, coal other minerals, or even diamonds—great caverns were excavated and the raw materials were extracted from the earth. The ore was hauled to the surface and processed, usually contaminating the water and scarring the surrounding lands. Once the mines had outlived their usefulness, they were just simple abandoned. Many of these mines have been in existence for over 100 years.

According to a study published in 1996 by the US General Accounting Office (Federal Land Management: Information on Efforts to Inventory Abandoned Hard Rock Mines, GAO/RCED-96-30, February 1996), "no definitive inventory is available concerning the number of abandoned hard rock mines located on federal lands." However one agency estimate cited in the GAO report indicates that there may be over 560,000 abandoned hard rock mines in the US alone (on both public and private land sites). One objective of the 1996 GAO report was to establish the hazards and estimated costs for remediation. To quote from their report, "The problems posed by abandoned hard rock mines can generally be classified as physical safety hazards or environmental degradation. Physical safety hazards, which can lead to human injury or death, may include concealed shafts or pits, unsafe structures, and explosives. Conditions causing environmental degradation may include drainage of toxic or acidic water, which could result in soil and groundwater contamination or biological impacts."

As for the estimated costs for remediation, the 1996 GAO report says, "No nationwide cost estimate for reclaiming abandoned hard rock mines on federal lands is available. Preparing accurate estimates of the reclamation costs requires detailed assessments, or characterizations, of the sites, involving physical inspection and in-depth evaluation of the problems at each site." According to the Report, the Bureau of Mines estimates between $4 billion to $35.3 billion to reclaim less than 30,000 sites on Interior and Forest Service lands. The Mineral Policy Center estimates between $33 billion to $72 billon to reclaim the 560,000 sites it projects are in existence nationally, regardless of whether the lands are publicly or privately owned.

DESCRIPTION OF THE PRIOR ART

Geothermal powered electrical generating systems are well known. U.S. Pat. No. 4,453,383, to Collins, discloses an apparatus of generating electrical power using solar energy and an air mass rising from a mine shaft. The mine shaft has a shaft opening at approximately the ground level, and a lower end portion of the shaft includes an air inlet. A solar collector convert's the sun's radiant energy into heat and heats a heat exchanger or working fluid as it passes through the solar collector to increase its temperature. A draft is induced into the mine shaft by rejecting heat from the heated working fluid, and the induced draft is used to produce electrical power. A control system operates a shaft dampener and the rate at which heat is stored in a primary reservoir so as to control the velocity of the air rising in the shaft and the power output of the electrical generator placed within the shaft.

Another type of power plant that draws its power from naturally occurring thermal energy is U.S. Pat. No. 3,894,393, to Carlson. This patent discloses a method and means for the generation of power from a controlled air flow, wherein an enclosed air mass is cooled at a high altitude below the temperature of the surrounding air. The air is isolated from the surrounding air by means of a large duct. The resulting cooler, denser air flows down the duct towards lower altitude and the energy of the falling air mass is extracted by means of a turbine generator.

Another type of power plant that draws its power from naturally occurring thermal energy is U.S. Pat. No. 4,497,177, to Anderson. This patent discloses a duct system for use in directing an air current for operation of power generators. Air movement is obtained by use of a basin of water covered by a solar energy transmitting dome spaced a distance over the basin. A surface type heat exchanger is located in the water adjacent the bottom of the basin, and an air inlet passage is provided having one end which terminates above the water surface, beneath the dome an opposite end connected to the heat exchanger. A long air outlet passage in the form of a flexible duct is connected to the outlet from the heat exchanger, which outlet passage extends downwardly along the mountain slope. Venturi tubes are located along the air outlet passage, and vane driven devices are positioned at the venturi tubes for operation by the cooled air flowing downwardly. An air valve at the bottom end of the air outlet passage controls the rate of flow there through.

U.S. Pat. No. 5,047,654 illustrates the use of a mine shaft which uses solar collectors to activate steam boilers within the mine shaft, which in turn drive generators for producing electrical power. The system relies on solar power conversion devices and locates key elements underground thereby decreasing thermal losses. A vertical mine shaft is used for transmitting collected solar flux from the above ground heliostat fields, down to an insulated boiler. The boiler converts injected water into superheated steam which drives a steam turbine connected to an alternator or generator producing electrical power.

U.S. Pat. No. 4,779,006, discloses a system for producing electrical energy including a stack shaped and positioned generally as the letter "J" and having an intake portion, an exhaust portion and a conveying portion there between together with a vacuum producing mechanism associated with the exhaust portion which causes air to move through the stack whereby a generator responsive to the moving air generates electricity.

Another patent of interest is U.S. Pat. No. 5,284,628 discloses the use of a convection tower for generating electricity. The evaporation of water sprayed in the tower is used to create strong airflows and to remove pollution from the air. Turbines in tunnels at the skirt section of the tower generate electricity.

Still another geothermal power plant is disclosed in U.S. Pat. No. 5,095,705, to Daly. Daly discloses a process for producing energy from introducing water down a borehole having a depth of at least 20,000 feet; providing a casing in the borehole of a certain diameter; introducing an internal pipe within the casing of a diameter less than the casing to define an annulus there between; providing a means to introduce quantities of water down the inner pipe at predetermined levels; providing an air turbine at the upper portion of the inner pipe so that when the water is introduced down the inner pipe a vacuum is established above the water flowing down the pipe, and air is sucked into the inner pipe through the blades of the air turbine to run the turbine; and allowing the water to turn to steam at the lower end of the inner pipe and returning the steam up the annulus between the inner pipe and the casing to the upper end of the casing and exiting the system.

U.S. Pat. No. 4,106,296, to Wood, discloses an air pressure differential energy generation system comprising a stack for conduction of air from a high to low atmospheric pressure level. A vapor injection device within the stack provides a method of filling the stack at least in part with water vapor. A heat exchanger is provided at the high atmospheric pressure end of the stack. A turbine is coupled to the heat exchanger and is impelled by the warmed air. An electrical generator is coupled to the turbine to produce electrical power.

U.S. Pat. No. 7,026,723, to Moreno, discloses a mountain supported solar chimney. The chimney receives air from a solar heat collector that heats the air below thereby creating an updraft of air. The air rises because of the difference in temperature and pressure between the base and the top of the chimney. The higher the difference in temperature and pressure the faster the air will rise. An array of turbines is driven by the air. At the top of the chimney a fine mist of electrically charged water, which is taken from the reservoir, is sprayed across the top of the tower thereby attracting pollution contained within the air. The water will fall because of gravity and will be collected in a second reservoir that will be sent down the mountain, through a pipe, to generate additional electrical power with a turbine.

Additionally, U.S. Pat. No. 4,801,811, to Assaf et al, discloses a method and apparatus for generating electricity by using an air dam located in the outlet of a canyon with an electrical generator positioned at the base of the air dam. The air in the canyon is cooled by spraying water into the air as it enters the canyon, and the cooled air flows downwardly towards the base of the dam and through the electrical generator. Preferably, the air dam is a flexible curtain covering the outlet of the canyon and suspension means are provided for suspending the flexible curtain at its top. The suspension means includes supports built into the canyon above the top of the curtain, the support preferably being a suspension cable suspended between towers on opposite sides of the canyon.

U.S. Pat. No. 4,507,916, to Anderson, is comprised of a ground supported dome with a plurality of air inlets adjacent to the bottom of the dome for admission of air thereto. A passage is formed in the earth having an inlet beneath the dome and having an outlet outside the dome at a level beneath the level of the air inlet. Cooling elements of a refrigeration system are located in the passage for cooling air contained therein beneath the temperature of the ambient air. The ambient air is drawn into the dome through the dome air inlets and moves in a cyclonic motion beneath the dome due to a Coriolis acceleration. The energy of the whirling cyclonic wind beneath the dome is harnessed by locating a wind operated means in the path thereof. A wind operated means consists of a plurality of blades, vanes or the like attached to a vertical shaft by arms whereby the blades are driven by the cyclonic motion of the air mass inside the dome thereby rotating the shaft and exploiting that energy by coupling the shaft to a generator.

U.S. Pat. No. 3,894,393, to Carlson, is entitled Power Generation Through Controlled Convection. The patent discloses a method and means for generation of power from a controlled airflow, wherein an enclosed air mass is cooled at a high altitude below the temperature of the surrounding air. Movement of the air within the duct is accomplished by an arrangement whereby the density of air within the duct is substantially different from the density outside the air duct. The resulting cooler, denser air flows down the duct toward lower altitude, and the energy of the falling air mass is extracted by means of a turbine generator.

SUMMARY OF THE INVENTION

The present invention provides a system for production of power, and in particular electrical energy, utilizing naturally occurring geothermal energy sources for conversion into electrical power.

Surface level (cold) air is captured in an air induction chamber and enters a substantially vertical intake shaft located beneath the surface of the earth. The shaft is provided with an insulated intake conduit fluidly connected to the air induction chamber so as to keep the air cold as is descends into the earth until it reaches an existing horizontal shaft or underground cavern. The air induction chamber includes features within the chamber to create a vortex of spinning air as it enters the insulated intake conduit. This is used to create the most suction of atmospheric air and higher velocity as the air begins its descent. The descending airflow naturally increases in velocity. This is called a "stack-effect" and is similar to the whoosh of air one feels when elevator doors open in a high rise-building. This kinetic force is used for power generation by driving wind/turbine generators that are integrated with the substantially vertical insulated intake conduit. The air passes from the substantially vertical intake shaft into the underground cavern (or selected horizontal shaft) and into a passageway located within a heat exchanger located within the cavern. The air is warmed as it passes through the heat exchanger.

The heated air is exhausted through an insulated exhaust conduit located in a substantially vertical exhaust shaft and then back into the atmosphere. Optionally, to enhance the energy producing power during this exhaust segment a controlled "tornado effect" (air vortex) can be created. The substantially vertical insulated exhaust conduit can optionally be designed with wind/turbine generators to extract the energy from the moving air and subsequently convert the kinetic energy into electrical power. The insulated exhaust conduit is capped at the surface of the earth to protect the opening and control distribution of the air as it re-enters the atmosphere.

The invention also seeks to provide a solution for converting an environmental and safety hazard such as a mine, either active or abandoned, into a source of almost infinite energy potential.

Accordingly, it is a primary objective of the instant invention to provide a constructive use for abandoned mines so that the cost of mine remediation will become more justified.

It is an objective of the instant invention to provide renewable, non polluting energy sources such as; harnessing underground hydroelectric power, tapping an underground geothermal well, creating underground farming to create biomass fuel and or fertilizer, and providing a system for remediation of under ground water sources and also to remediate atmospheric and underground air.

It is a further objective of the instant invention to create an economic opportunity that is beneficial to society, not only by providing renewable non polluting energy, but also by removing many of the environmental and safety hazards which presently exist and are largely ignored. Additionally, the instant invention will provide an economic stimulus to the present and former mining towns where these geological formations are to be found.

It is yet another objective of the instant invention to reduce the production of green house gases by decreasing the amount of electricity produced by the combustion of hydrocarbon fuels.

It is a still further objective of the invention to provide significant amounts of alternative energy to reduce ones dependence upon the availability of petroleum products from oil exporting nations.

Other objects and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE FIGURES

Other features and advantages of the invention will be apparent from the following description taken in connection with the drawings, wherein:

FIG. 7 is a sectional view of a geothermal power generation system showing various system components.

FIG. 12A is a sectional side view of a steam powered electrical generation system using a geothermal well that is bored within a subterranean cavern.

FIG. 12C is a sectional side view of a steam powered generation system where the generator or generators are located underground and are powered by a geothermal well that is bored within a subterranean cavern.

DETAILED DESCRIPTION OF THE INVENTION

The present invention is based upon the identification and exploitation of geological formations wherein the ambient surface air temperature is cooler than the underground geothermal temperature. Mountainous mining areas are often substantially cooler than the inner earth, geothermal, temperature within the underground caverns of the mines. It is well recognized that cold air naturally descends and warm air rises. While the invention will be described with respect to mines, and in particular abandoned mines, it is to be understood that the invention could likewise be used in other types of natural or manmade geological formations such as missile silos, salt domes, tunnels, etc.

Figure 1:
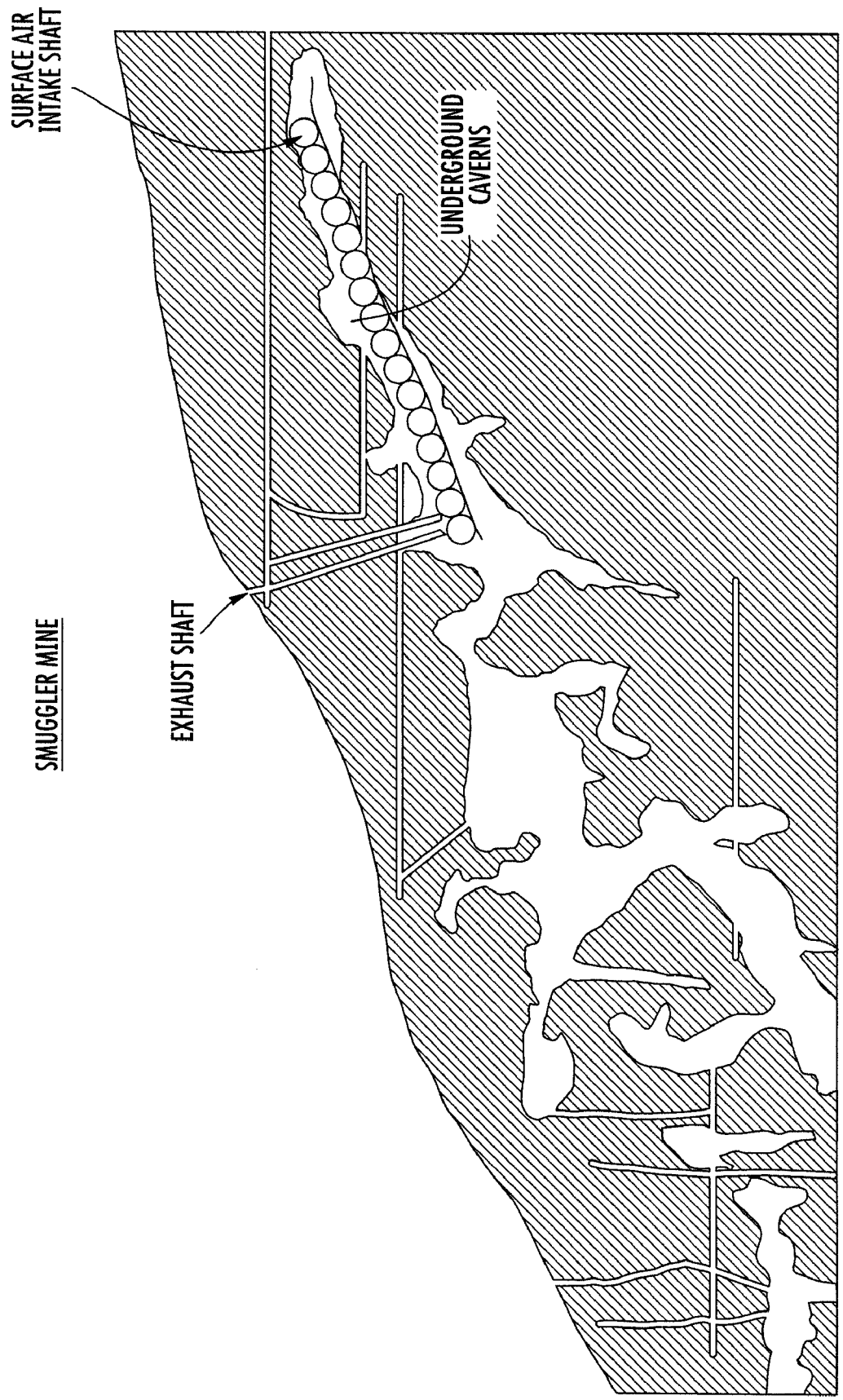
FIG. 1 is sectional view of the invention as it would be configured in the Smuggler Silver Mine in Aspen, Colo.

Referring now to FIG. 1 of the drawings which contains an illustration of the Smuggler Mine located in Aspen, Colo. with a schematic showing how the instant invention would be used in this location. The Smuggler Mine is an historic site dating back to the early settlement of Colorado in the late 1800's. Aspen, Leadville, in fact, nearly all of Colorado's Western Slope settlements came into being because of mining activities. The Smuggler Mine is just one of potentially thousands of mines in Colorado that would be well suited for the disclosed geothermal power system. The Smuggler Mine stopped commercial mining activities many years ago. The mine is in generally good condition and is not considered a potential health risk to the community. The anticipated level of sub-surface remediation necessary to implement the geothermal power system is considered minimal. The physical characteristics of the Smuggler Mine are ideal for implementation of the geothermal power system of the instant invention. There are numerous mineshafts with diameters of at least 6 to 8 feet and with depths of between 500 and 1,000 feet that can be utilized. There are also multiple, massive underground caverns (stopes) and there is access to the mine system through large tunnels (avits) that remain in good condition. In addition, the temperatures within the mine caverns are high. It is believed that they range from 70 to over 100 degrees Fahrenheit. The ambient temperature at the surface of the earth in this mountainous region is low. Aspen's average temperature range between a low of 25 degrees and a high of 55 degrees Fahrenheit. Because of the differential between the atmospheric and internal mine temperatures, the mass of air that will be inducted into the geothermal power system will be substantial and will produce significant kinetic energy that can be converted into electrical power. As shown in FIG. 1 in general terms the geothermal power system includes an air intake chamber, an air intake shaft, a cavern (or stope), and an air exhaust shaft. The system details are as follows.

Figure 2:
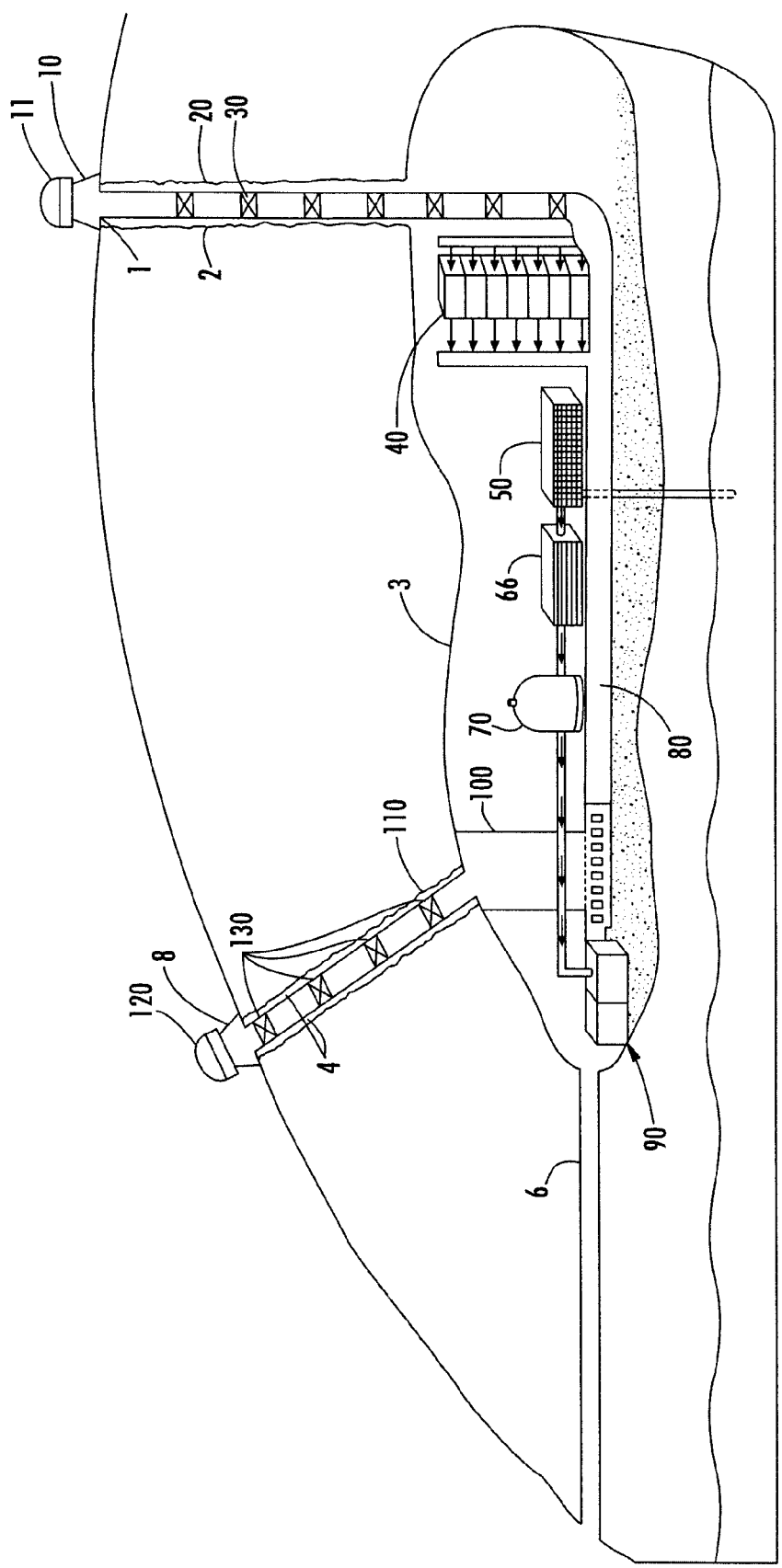
FIG. 2 is a sectional view of the geothermal power generation system showing the system components.

As shown in FIG. 2 the geothermal power system has an air inlet at the surface of the earth 1, a substantially vertical intake shaft 2, a horizontal passageway or cavern 3, an exhaust outlet 4, and a cavern access tunnel 6. Placed directly above air inlet lies an air induction chamber 11.

Figure 3:
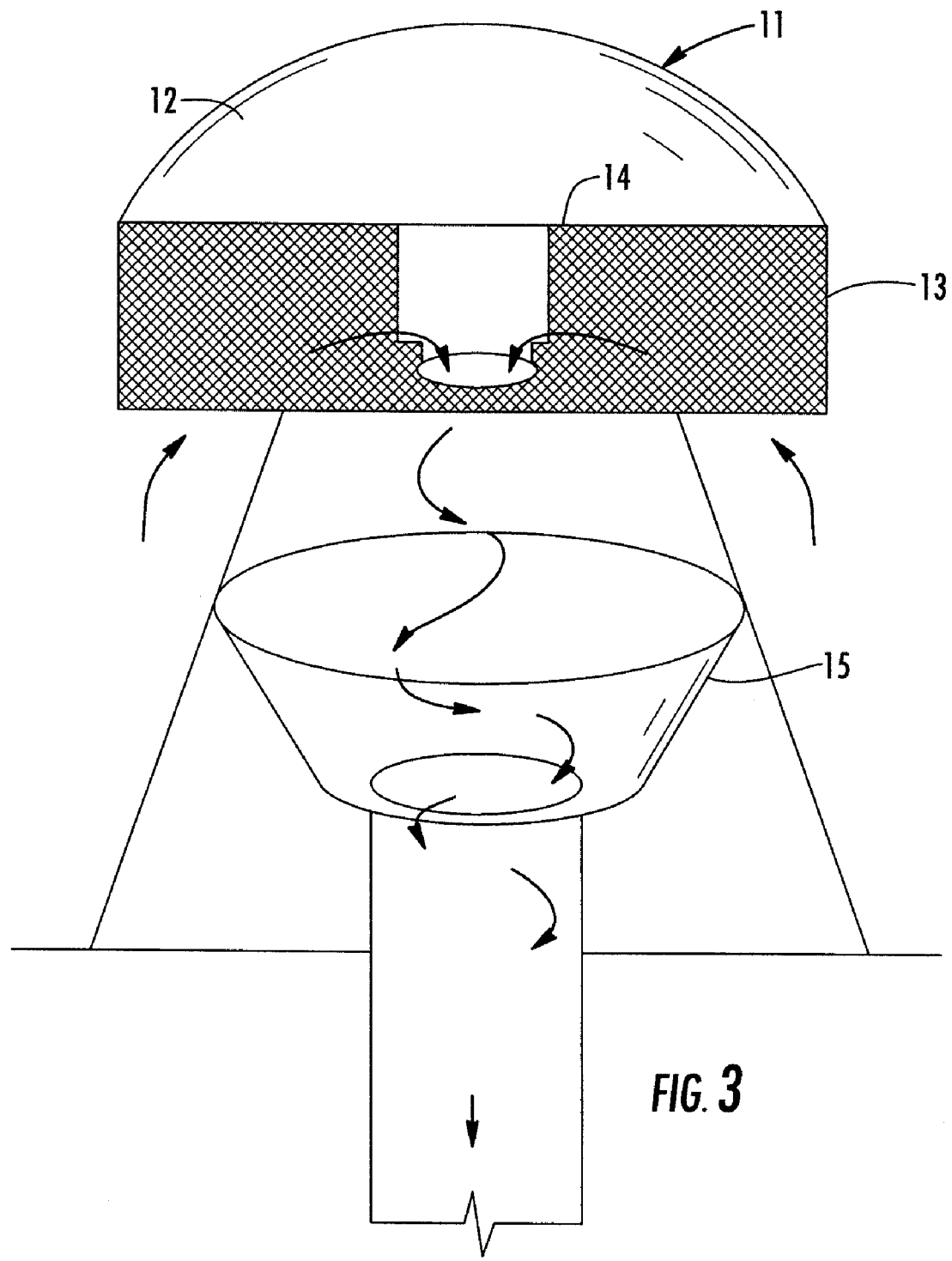
FIG. 3 is a side view of the air induction chamber including an air amplifier, and a vortex generating bowl.

The air induction chamber 11, shown in greater detail in FIG. 3 consists of an insulated dome or roof 12 an air intake 13 an air amplifier 14. The surface level ambient air is captured in an air induction chamber 11 and is then induced into a vortex generating bowl 15 which is fluidly connected to insulated intake conduit 20 located within the substantially vertical insulated intake shaft. The air induction chamber 11 is an above ground component of the system. It is a mushroom shaped structure built above the selected mineshaft. It is approximately 20 feet wide at the base with sides sloping to 15 feet. The roof is a 25 foot wide domed cap. The 5 foot overhang of the roof is used for air intake vents 13. The entire unit is about 20 feet tall. It protects the mineshaft opening and stands above the elements.

The contemplated building will be a custom designed monolithic dome which is constructed using an airform, polyurethane foam, steel reinforcing bar and shotcrete. These materials and construction techniques are also used in other system components. The result will be a cost-efficient, super-insulated and disaster-resistant building. The dome roof will be made into an energy generating solar collector using photovoltaic array or other methods currently available. The use of the solar energy will be used to dissipate the heat from the intake and further cool the atmospheric air as it is introduced into the chamber. The solar energy will also provide the energy to run the air intake components.

The intake chamber 11 houses the air intake components and other key equipment such as electrical transformers, communications equipment and a davit (not illustrated) for shaft maintenance. Vents 13 on the overhanging portion of the domed roof allow the atmospheric air to be pulled into the chamber for protection from the rain and snow. Also within the intake chamber is an air compressor (not illustrated) and an air amplifier 14. Using these as starting devices within the chamber, the suction of atmospheric air through the vents is optimized. A vortex bowl 15 is used to create a spinning motion to the air, sealing pressurizing and increasing the velocity of the airflow as it enters the air intake conduit.

Figure 4:
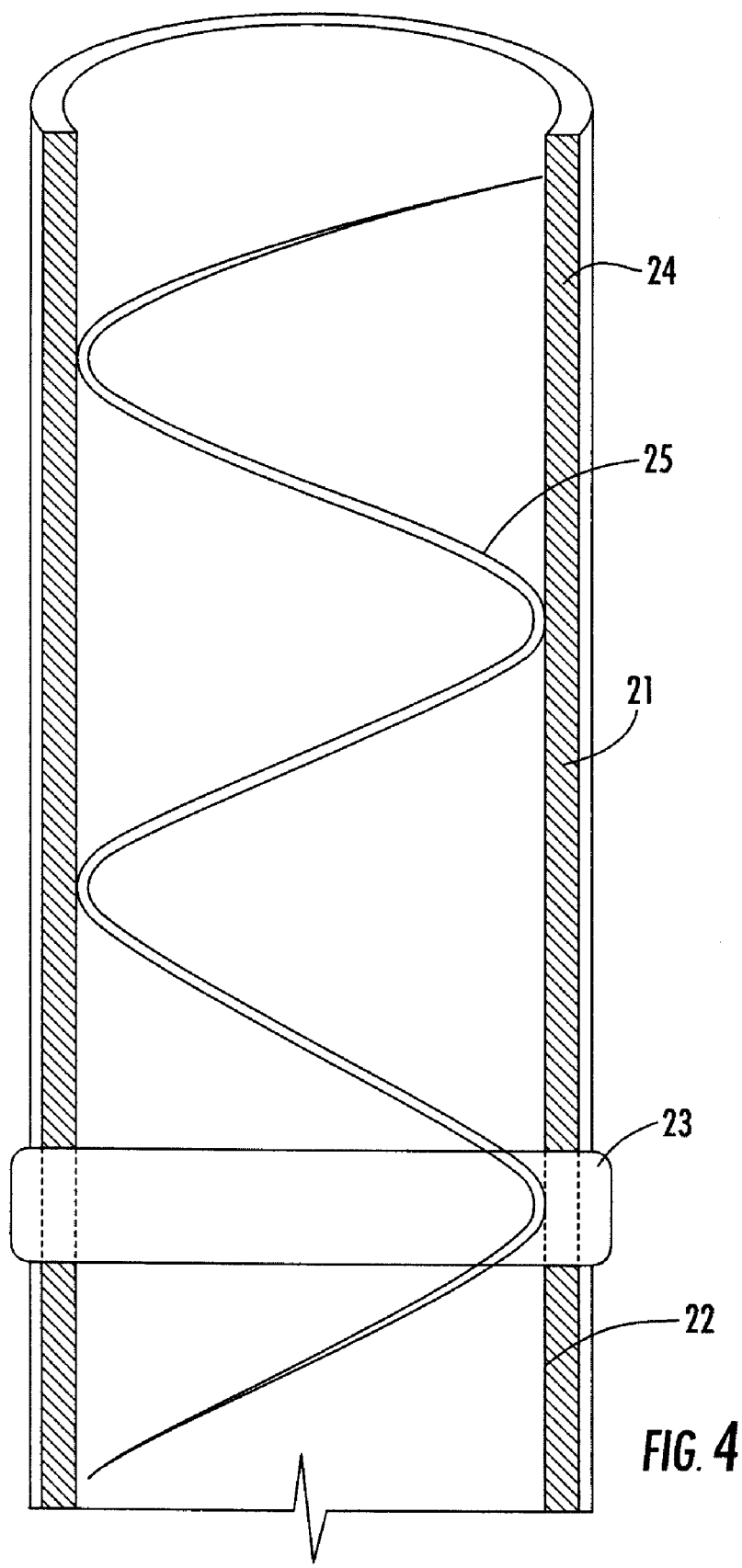
FIG. 4 is a cross sectional view of the insulated conduit located within a substantially vertical shaft extending between the surface of the earth and the subterranean cavern.

The substantially vertical intake shaft 2 and the insulated intake conduit mounted therein can descend many hundreds of feet into the cavern 3 where the cold air will be warmed and processed. The intake shaft 2 should be a minimum of six feet in diameter. As it exists, the intake shaft 2 will have rough stone walls with possibly intersecting horizontal shafts intersecting its path. This will cause friction, slow down the flow of air and also allow air to escape. At a minimum, the intersecting horizontal shaft openings must be sealed. To seal the intake shaft and optimize the flow of air, permanent intake conduit 20 may be installed. As shown in FIG. 4 the intake conduit is constructed in interlocking sections, shown by way of example, as sections 21 and 22 that are joined by connector 23. The entire length of the air intake conduit is constructed in a similar fashion and covered with insulation material 24. Extending radially inward from the interior wall of conduit is a helical rib 25 extending along the length of the conduit. This helical rib 25, or rifling, imparts a vortex like flow to the mass of air passing there through.

Figure 5:
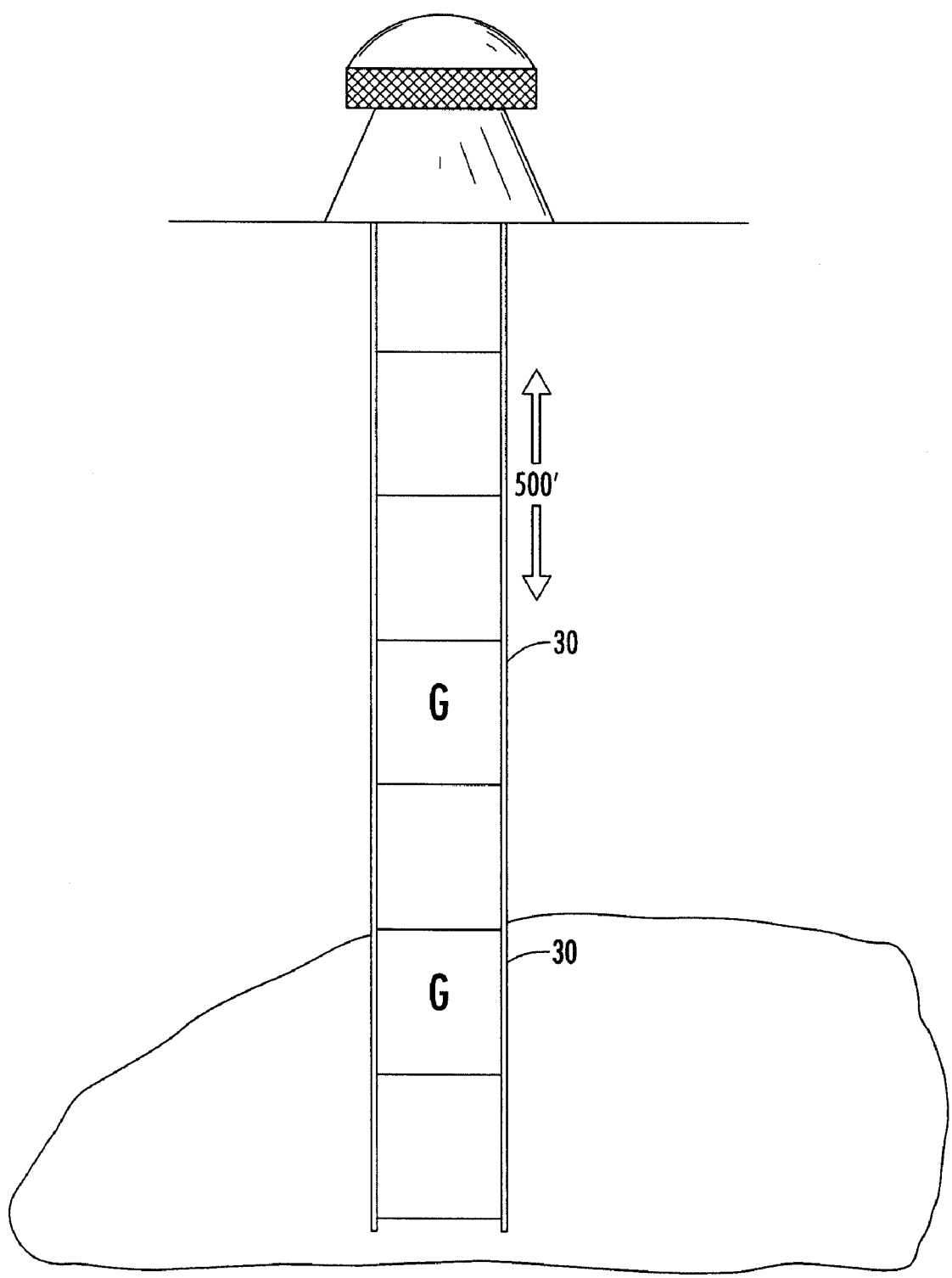
FIG. 5 is a schematic representation of the air induction chamber the insulated conduit with in line generators and the subterranean cavern.
Figure 6:
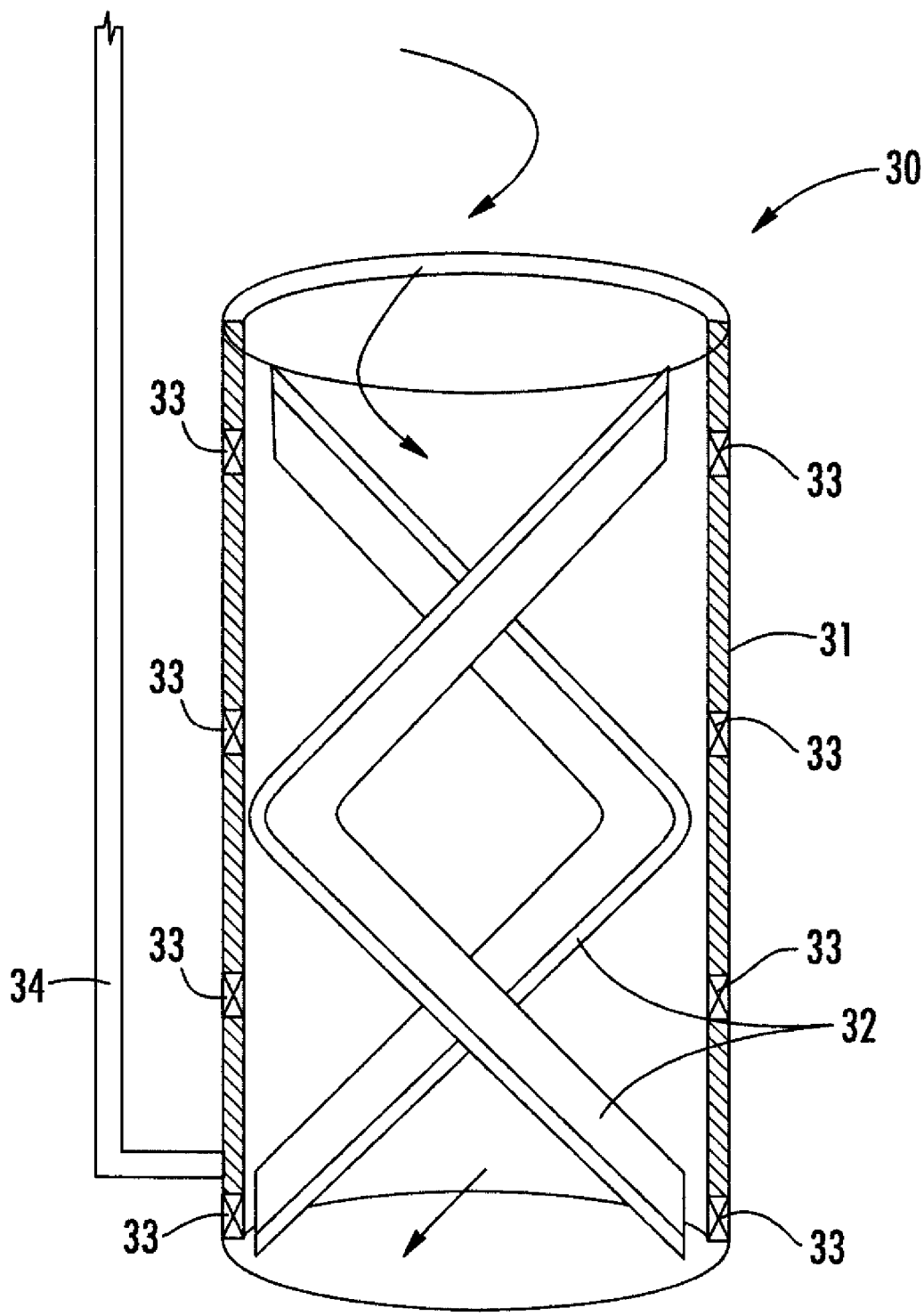
FIG. 6 is an illustration of a double helix cylinder wind turbine/generator.

As shown in FIGS. 2, 5 and 6 one or more low velocity wind turbine/generators 30 can be incorporated into the flow path of either or both of the insulated intake and exhaust conduits. These will be double-helix vane turbines, or any other suitable/generator type device, designed to spin within the conduit with minimal air resistance. The turbines will be optimized to produce their maximum energy output at sustained wind-speeds of approximately 25-30 mph. The cylinder housing 31 is approximately six feet in diameter and 10 feet in length. It is interlocked with the adjacent conduit sections and is also permanently affixed to the walls of the substantially vertical intake and exhaust passages with rebar. The double helix blades 32 are aero-dynamic metal vanes that spin freely as the air mass passes through the cylindrical housing 31. In one embodiment, electricity is produced as the blades spin within magnets 33 located within the wall of cylindrical housing 31. Electricity is subsequently transmitted via a line feed 34.

Once the cold ambient air has descended through the insulated air intake conduit it enters a conduit 80 in heat exchange with the subterranean cavern 3, as shown in FIG. 2. Conduit 80 thereby acting as a heat exchanger between the induced air flow and the geothermal temperature within the cavern. In some instances multiple caverns may be used where the air will be heated and processed. The preferred cavern(s) will be large open spaces that were previously mined and referred to as "stopes". The example cavern shown in the Smuggler Mine (FIG. 1) is over 2,500 feet long with an average height of over 100 feet. Assuming that the cavern is at least 100 feet wide, over 25 million cubic feet of space is available and this is only one of the numerous caverns already excavated underneath the surface. The cavern may also have connecting horizontal tunnels 6 previously dug and used to haul out ore deposits.

Almost every mine is going to have a water source that can be used. Some of the mines are at least partially flooded with shafts that are below the water table. Contaminated water can be pumped, filtered by filter 50, used and released as clean water. As shown in FIG. 2 water is pumped from the mine, passed through filter 50 and then heated by heater exchanger 66. The heated water then flows to boiler 70 and is converted to steam. A small amount of steam will be used to start and perpetuate the vortex engine used in the exhaust energy production phase, as will be discussed below.

As the air passes through the cavern, a portion of the air flow will also pass through a series of carbon and ultraviolet filters 40 that will cleanse the air and remove most pollutants. It is also proposed that $CO_2$ can be absorbed using a newly created technique developed by Professor Klaus Lackner of Columbia University and licensed from Global Research Technologies. The design offered by Global Technologies is a series of towers built above the earth's surface to collect carbon dioxide from the atmosphere. Rather than use this costly approach, utilizing the constant airflow and vast space of the caverns made available by the geothermal energy system collection and storage can be done much more efficiently underground. Since the filtering of the air and the carbon dioxide processing phase will necessarily impede the flow of air through the system, the conduit will branch and divert only a portion of the air for filtering and storage. In that regard, portions of the air can be compressed and stored for use during periods in which energy demand is higher or maximum energy potential cannot be derived from the naturally occurring airflow. This might occur when the temperature differential between the ambient surface air and the underground geothermal air is less than optimum levels. In this case, the air can be stored in a series of balloon-like containment vessels (not illustrated) and released on demand. As mentioned above, only portions of the total airflow can be diverted for filtering. Otherwise the natural air inducement process will be impeded. The air that can be filtered will enter a branch of the conduit, processed and returned to the energy producing component of the system. The carbon dioxide and other gases that are filtered will be sequestered and stored for either residual uses or disposal.

A vortex engine/tornado chamber would be constructed within the subterranean cavern as shown in FIG. 2. An example of a vortex engine which could be used in the geothermal power system of the instant invention is disclosed as an atmospheric vortex engine in U.S. Pat. No. 7,086,823, to Michaud, which is herein incorporated by reference. Combining a starter stream of steam and spinning the ducted warm air supply from conduit 80 in a chamber will produce a high velocity tornado effect that will be used to drive a specially designed wind turbine/generator 90. A tornado chamber 100 will be constructed in the cavern, leading to a substantially vertical exhaust shaft that exhausts the air back into the atmosphere at a low velocity. The tangential air entries around the base of the tornado chamber will receive the air supply from the conduit 80 located within the cavern. The convection process created within the tornado chamber will be similar to an exhaust fan, thus pulling more air from the atmosphere and producing greater velocity in the shaft. The larger diameter tornado chamber will either end at the top of the cavern or may extend into the substantially vertical exhaust shaft 4. The exhaust conduit 110 contained within the substantially vertical exhaust shaft 4 will be configured in a similar fashion to that of the intake conduit 20 previously described. Likewise, in a similar fashion lower velocity turbines/generators 130 can be placed in the exhaust conduit to create additional energy.

The insulated exhaust conduit 110 terminates at the surface of the earth and is covered and protected with a domed shaped structure 120 similar to the air induction chamber described above. The dome will act as a deflector distributing the flow of wind as it reenters the atmosphere. As an additional use, the warmed air can be used for other beneficial purposes. One possibility might be to create a large green house on the mine site property which is warmed by the sun and the exhausted air. Plants could also be grown hydroponically using the filtered water from the mine below. Additionally, some of the captured carbon dioxide could be introduced into the greenhouse, enhancing the growth and being converted back into oxygen by the natural photosynthesis process.

Referring to FIG. 7 of the drawings that shows another overall system construction for the geothermal power system. The geothermal power system has a first substantially vertical intake shaft 102, a horizontal passageway or cavern 104, an exhaust outlet 105 and a cavern access tunnel 106. Placed directly above the first vertical intake shaft 102 is a first air induction chamber 111. First air induction chamber 111 is configured in the same fashion as air induction chamber 11 described in FIG. 3. The geothermal power system also includes a second substantially vertical intake shaft 103 which communicates directly with a lower portion of cyclonic chamber 200. Placed directly above the second vertical intake shaft 103 is a second air induction chamber 112. Air induction chamber 112 is configured in the same fashion as first air induction chamber 111 and the air induction chamber described in FIG. 3. Both the first and second vertical intake shafts 102 and 103 are located within insulated conduits 121 and 122, respectively.

As shown in FIG. 7, one or more low velocity wind turbine/generators 130 are placed within the flow path of first vertical intake shaft. Turbine/generators 130 are double helix vane turbines designed to spin within the first vertical intake shaft with minimal air resistance. Turbine/generators 130 are constructed in the same manner as turbine/generators 30 described in FIGS. 2, 5 and 6. The electricity produced by turbine/generators 130 is subsequently transmitted to an appropriate location for distribution.

Figure 9:
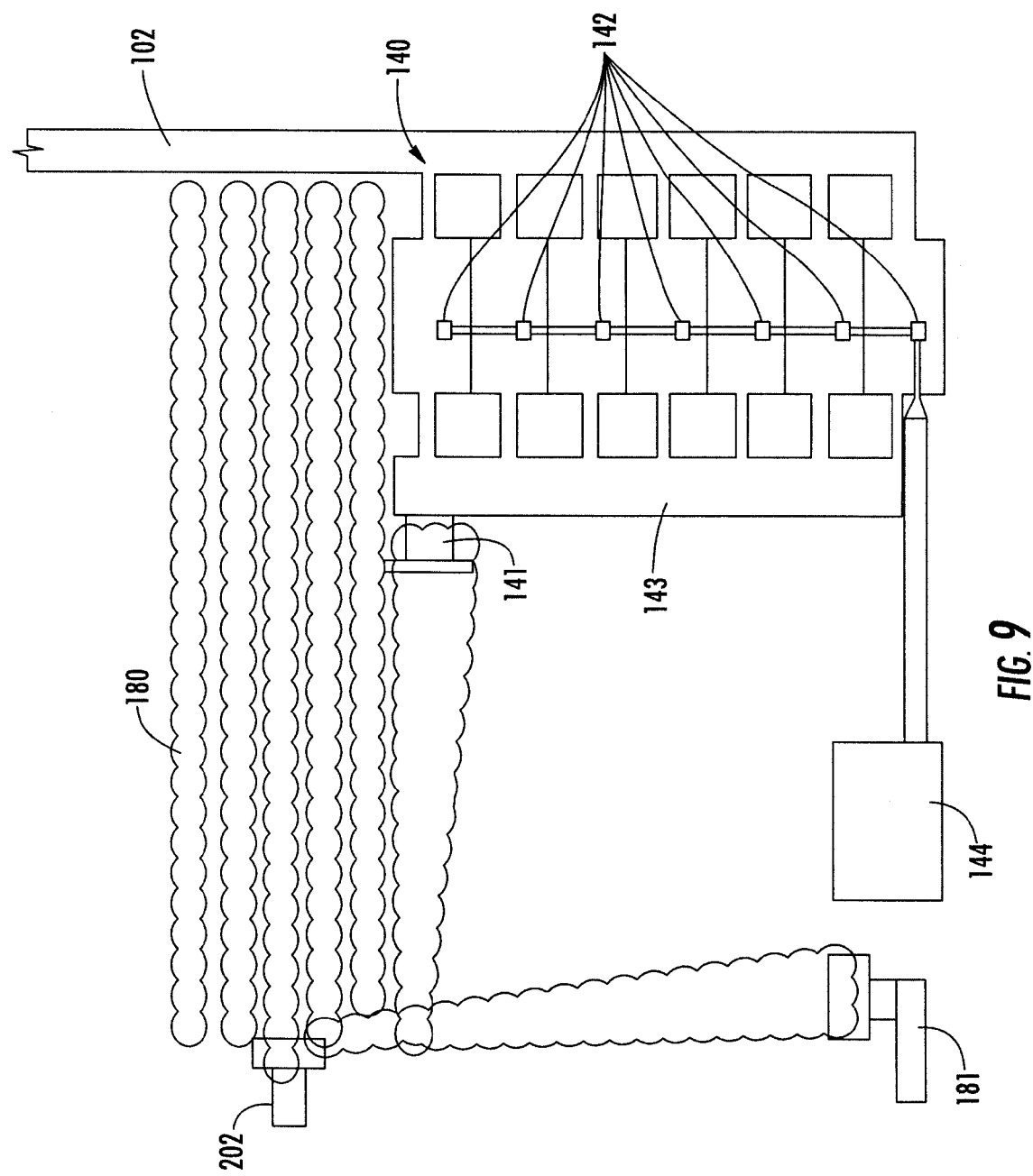
FIG. 9 is a perspective view of the carbon dioxide capturing system shown in FIG. 7.

Once the cold ambient air has descended through the insulated first vertical shaft it enters the cavern and is directly introduced into carbon dioxide filter 140. The carbon dioxide filter 140 will absorb the carbon dioxide from the intake air. By way of example, filter 140, as shown in FIG. 9, consists of seven stacked units each unit having a volume of approximately two thousand cubic feet. While it should be recognized that the total size of the carbon dioxide filter is dependent on the size of the cavern, and system, the example shown has a total capacity of approximately fourteen thousand cubic feet. The carbon dioxide is removed via outlets 142 and stored in container 144 for further use or disposal. The cleansed air then exits carbon dioxide filter 140 by way of flow path 143 and then through carbon dioxide filter outlet 141.

Air exiting outlet 141 enters warm air ductwork 180. The warm air ductwork 180 is located in the upper regions of the tunnel or cavern in a suspended fashion. The ductwork is stacked and coiled back and forth upon itself and absorbs the natural warmth of the cavern's temperature. The ductwork is also mounted above suspended cavern lighting fixtures 210. Lighting fixtures 210 produce heat when in operation. As the heat from the lighting fixtures rises the heat that would otherwise be lost is recaptured when it is absorbed by ductwork 180 located above the lighting fixtures.

The warmed air exiting warm air ductwork 180 is then introduced into the air intake 181 of cyclone generator 200. The air intake 181 then distributes the warmed air to three hot air inlet ports 182 that are spaced ninety degrees from one another along the bottom of the outer cylindrical surface of cyclone chamber 200, as shown in FIG. 8B. The warm air in then directed by baffle plates 184 located within the cyclonic chamber 200 at each hot air inlet port 182 into the cyclonic chamber 200 in a counter clockwise rotational direction. In addition, steam produced by steam generator 170 is introduced to each of the hot air inlet ports 182 at steam inlet jets 183. The water for the steam generator is taken from an underground water source 152 and then passed through a filtration system 150. The filtered water is then introduced to the steam generator 170 for subsequent admission to the cyclonic chamber 200 at steam inlet jets 183 with the warmed air.

The cyclonic chamber 200 is approximately 100 feet in height and 50 feet in diameter. It is built to withstand high wind speeds in excess of 50 miles per hour. It can be built out of metal, similar to a grain storage silo, or steel reinforced shoterete as used in other mine structures. In should be recognized that the size of the cyclonic chamber 200 may vary according to the configuration of the mine-site, shafts and caverns. The cyclonic chamber 200 is built on a concrete base that rises approximately ten feet off the floor of the cavern and includes hot air inlet ports 182.

The geothermal power system has a second substantially vertical intake shaft 103 which extends from the earth's surface through the ground and into the cavern and then into the bottom of the cyclonic chamber 200. The cold dry air descending collides with the spiraling warm humidified air that is rising from hot air inlets 182 and enhances the cyclogenesis effect within the cyclonic chamber 200. Placed directly above the second vertical intake shaft 103 is a second air induction chamber 112. The second vertical intake shaft 103 is located within an insulated conduit 122.

Figure 8A:
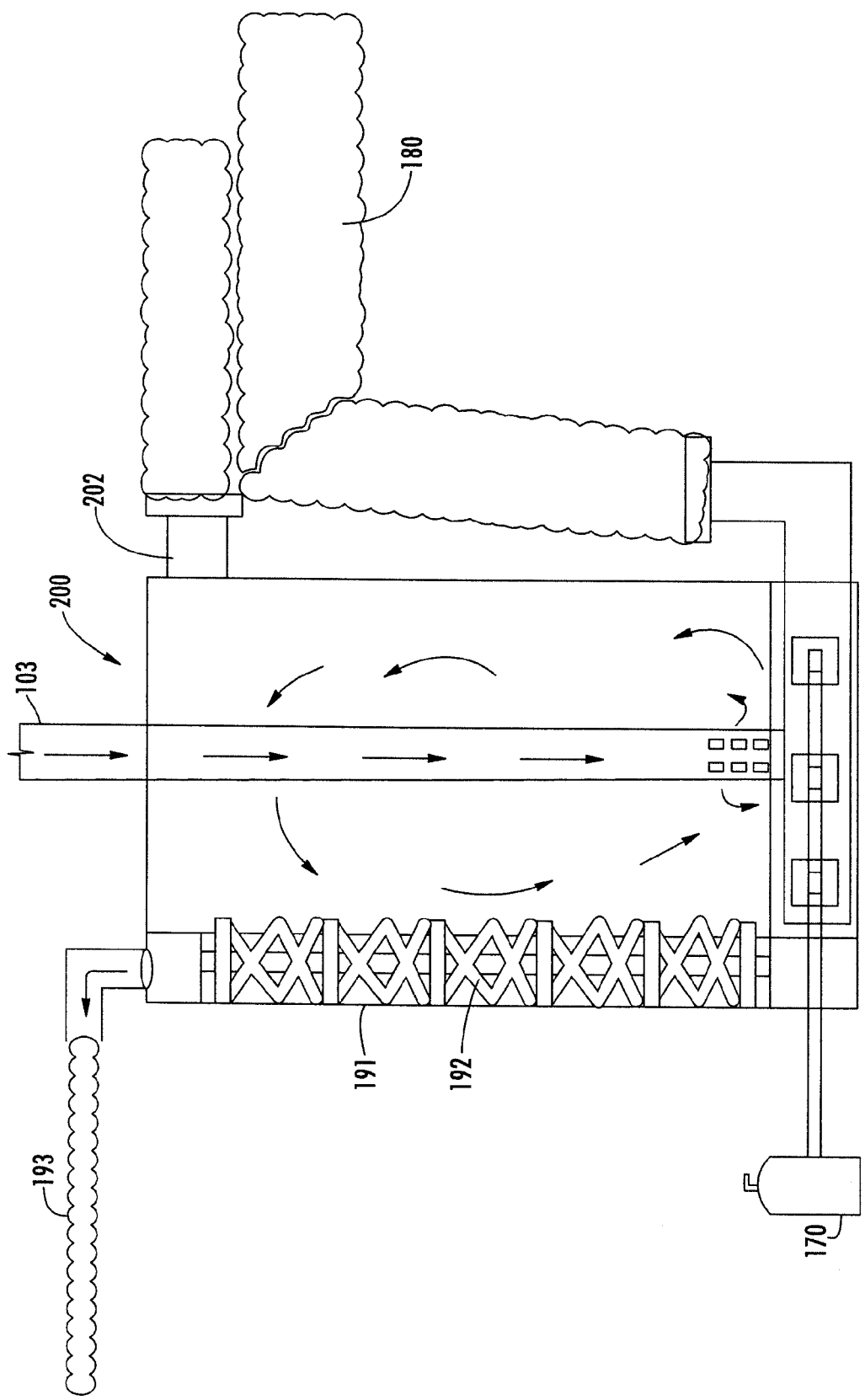
FIG. 8A is a side view in section of the cyclonic chamber shown in FIG. 7.
Figure 8B:
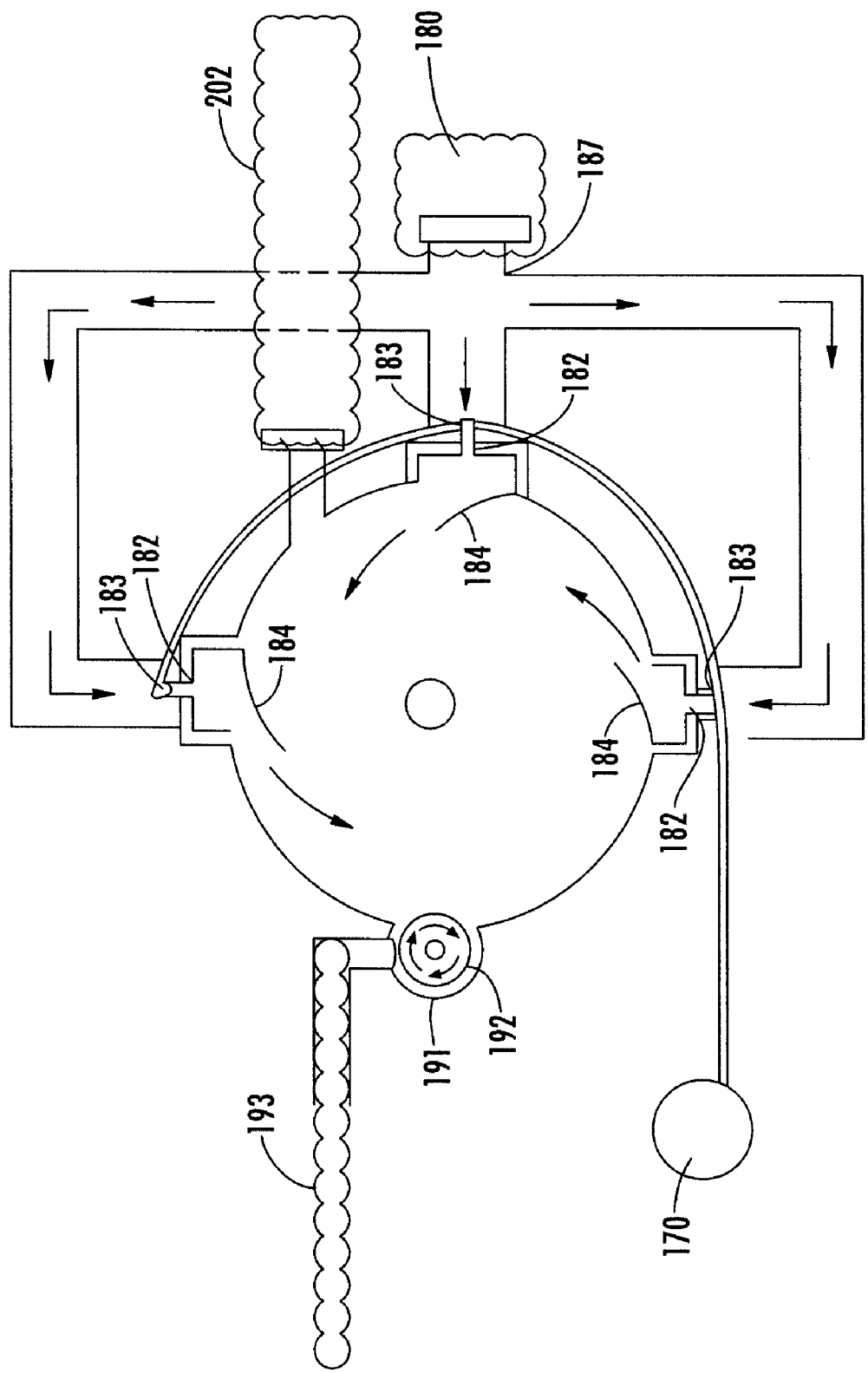
FIG. 8B is a top view in section of the cyclonic chamber shown in FIG. 7.

Referring to FIGS. 7, 8A and 8B a turbine chamber 191 is attached to the cyclonic chamber 200. It contains multiple unit vertical axis wind turbines. The turbines are formed with double helix blades. The units are stacked and bolted to each other to form a single vertical unit 192. The face of the turbine blades extend approximately two feet into the cyclonic chamber 200 and air is turned by the counter clockwise wind forces created with the cyclonic chamber. The turbine 192 is turned in a clockwise direction. A center shaft of the vertical turbine 192 is rotatably connected to the rotor of an electrical generator 190. The generator 190 is located below the wind turbine chamber 191 and its rotor will spin with the rotating vertical turbine 192. As it rotates it will generate electrical power which is transmitted to a transformer which, in turn, connects to the power grid and/or provides power for internal uses with the geothermal system.

A portion of the hot swirling humidified air at the upper end of cyclonic chamber 200 is recirculated back to the warm air ductwork via passageway 202 to recapture the heat to be reused. At the same time the balance of the warm hot air at the upper end of the cyclonic chamber 200 is directed through exhaust ductwork 193 for use in other areas of the mine, or cavern, or exhausted to the atmosphere.

The underground geothermal energy system is capable of using underground caverns to grow plants for biomass and biofuel production, biopharmaceutical and medical products, organic food products or other purposes that may be suitable for the sheltered and controllable environment that the mine can provide. The underground geothermal energy and agriculture system is a novel way of conducting underground farming because the energy generated by the geothermal and wind processes will be used to provide the necessary power for the lighting, the pumps and other machinery needed for the underground farming, thereby greatly reducing the costs of production. In addition, the induced air exhausted from the geothermal power system will be used to circulate air and warm the growing areas. The carbon dioxide that has been sequestered from the incoming air is concentrated for subsequent use in the plant's photosynthesis process, thereby providing cleaner air to the environment as a byproduct of the agricultural system. Further, the agricultural system will use underground mine water that is pre-treated to remove the most toxic and undesirable chemicals. The water treatment system will use some of the power generated by the geothermal power plant system to remediate the water to whatever degree needed.

Figure 10A:
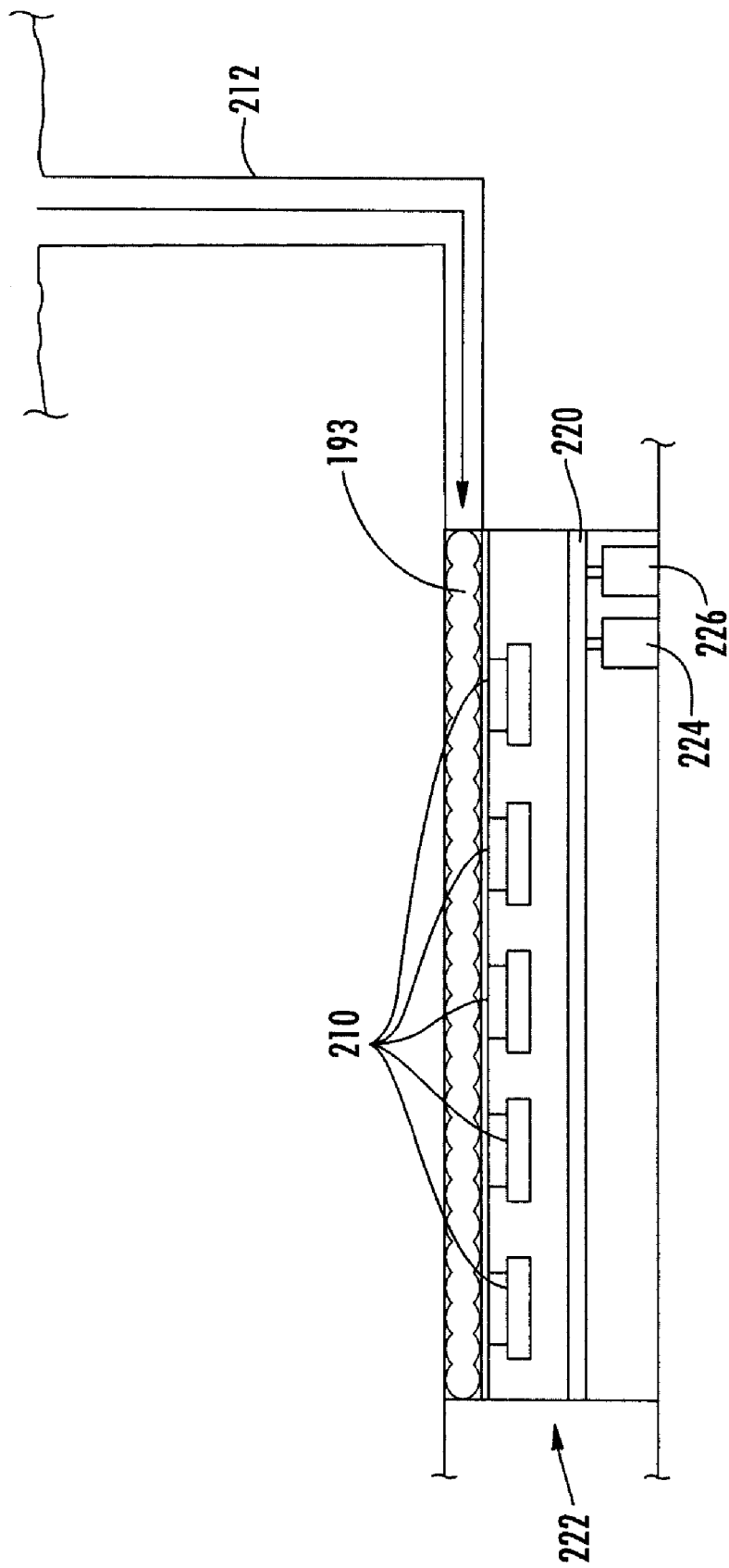
FIG. 10A is a side view of a growing chamber located within a horizontal tunnel.
Figure 10B:
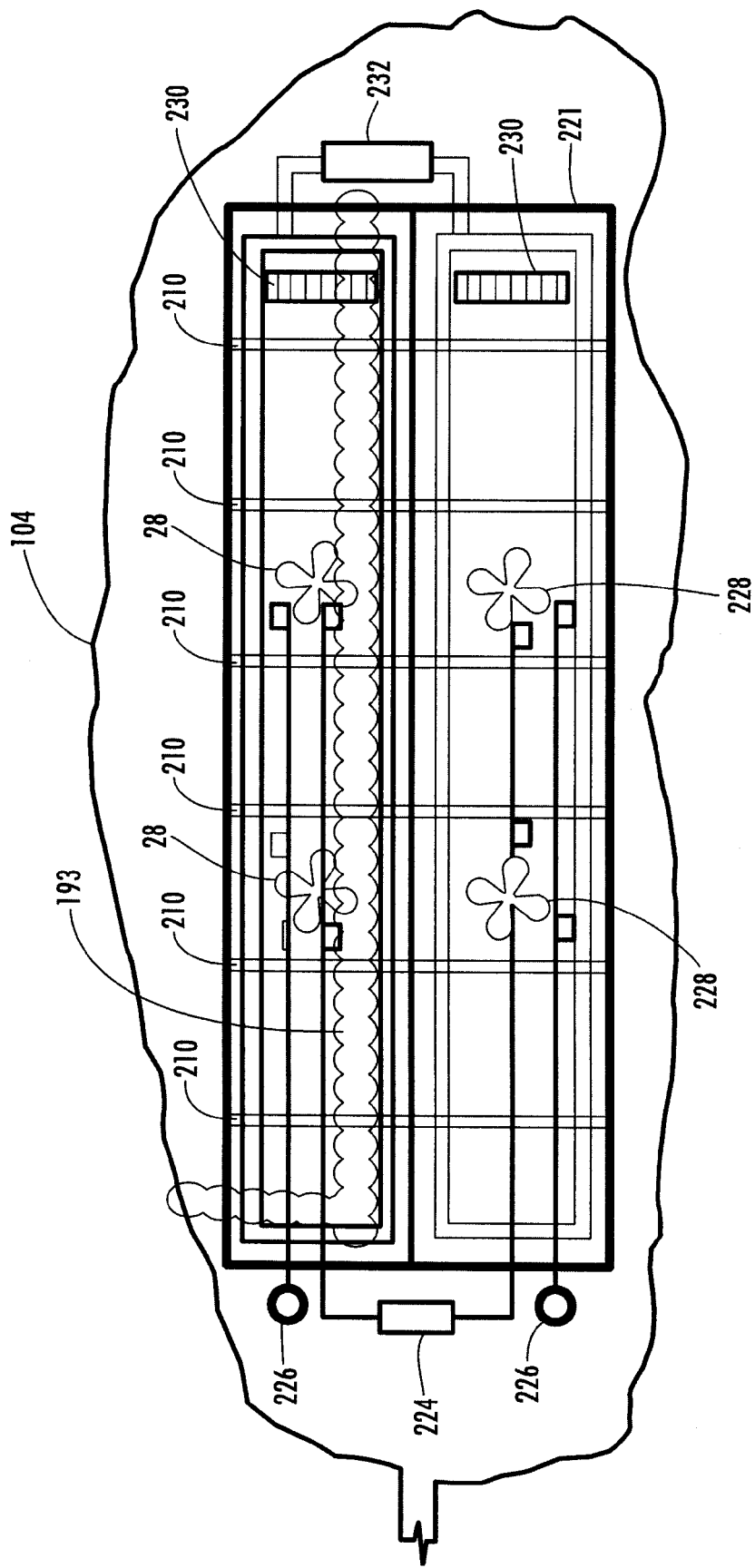
FIG. 10B is a top view of the aquatic growing pond located within the tunnel cavern.

The plants in the underground agricultural system can be grown in aquatic ponds, hydroponically, or in traditional soil. The underground caverns of the mine would be used to construct aquatic ponds for cultivation of bulky masses of algae such as strains of cyanobacteria or spirulina. The size and number of ponds will vary from location to location. The cavern's floor surface would be graded and lined to contain the ponds. The plants may also be grown hydroponically. There are three different ways of culturing hydroponically-grown plants. The simplest one, the nutrient film technique, simply uses a plastic trough as a container. Holes are placed in the top to hold the plants. The trough is sloped slightly, so the solution will flow to a reservoir. The second is an aggregate system of hydroponics uses inert material, such as clay pebbles or foam chips to surround the roots and provide support to the plant. The most common aggregate is the flood and drain method, which fills a container with aggregate and then the container is flooded with nutrient solution as often as necessary. Aeroponics is the third method of growing wherein oxygen is infused into a nutrient solution allowing the roots to absorb nutrients faster and more easily. This facilitates rapid growth resulting in higher yields. Aeroponics is a hydroponic technique involving the use of sprayers, nebulizers, foggers or other devices to create a fine mist of solution to deliver nutrients to plant roots. Aeroponic techniques are used in the cultivation of high value crops and plants specimens that can offset the high setup and maintenance costs associated with this method of horticulture. Treated water from the mine will be used to fill and replenish the hydroponic or aeroponic bench 220 as shown in FIG. 10A. Carbon dioxide is introduced to the plant bench from source 224 and nutrients are introduced to the plant bench 220 from source 226. Light suitable for growing plants is provided by suspended light fixtures 210. Additional lighting can be provided via transmission of solar lighting taken from the earth's surface and transmitted to the growing chamber through a light tunnel or fiber optic system 212. Positioned above light fixtures 210 is warm air ductwork 193 to provide additional heating for the growing material. FIG. 10B is a top view of an aquatic pond 221 situated within a cavern. The pond 221 is fed by water pump and inlet 232 which circulates water through the pond which exits through drain 230. The pond also includes underwater paddle wheel mixers 228 to evenly distribute the nutrients and carbon dioxide throughout the pond 221. Nutrients are distributed through conduits 226 and carbon dioxide is distributed through conduits 224. Light fixtures 210 are moveably suspended over the pond to provide even light distribution over the pond. In addition, warm air ductwork 193 is positioned over the pond to provide additional heat to the plant material. By way of example, the cavern in this embodiment is nine hundred feet long and five hundred feet wide. As shown the area consists of two ponds each six hundred feet long and one hundred feet wide.

Thus, regardless of what plants need to be grown or method used, the underground agricultural system will provide the space and means for large scale, reliable and cost effective solutions. This will all be done underground, without displacing land based acreage currently used for food crops.

Harvesting processes will vary as well. Some crops such as algae would need to be dried and their oil extracted through a refining process. Other crops, such as mustard or rapeseed, will need their seeds to be separated and pressed to obtain the oils needed for making biofuel. Crops such as switchgrass, with higher cellular content, would have to be broken down with enzymes before their oil can be extracted. All of these refining processes can be installed in the mine-site or on its property.

After the oil is extracted, from whatever plant source or method, there will be a residual biomass material that can be burnt or composted to produce more energy. This process can also be accomplished efficiently on the mine site's property. If the product is burnt, the energy can be used directly to provide steam and power turbines. If the product is composted, an anaerobic waste reactor can produce methane as fuel source for a generator. The remaining compost can be burnt for energy production or recycled for use as a fertilizer.

The entire process of agricultural production, from growth to finished product can be accomplished within the underground system and mine's property. By using the renewable energy provided by the geothermal energy system and other natural byproducts of its process, growing agricultural products underground on a large scale can become an achievable, reliable, and economically feasible solution.

Many abandoned mines have underwater caverns and mineshafts and actively release water to surface streams. At least some of the underground mine pools represent formidable environmental challenges. However, with a change in philosophy and some creativity, this water can represent an untapped resource rather than a pollutant source.

The water discharge rates vary from mine to mine, but can be quite significant, from hundreds to thousands of gallons of water per minute. The current flowing from within the mines can be utilized to create hydro-electric power. The revenues generated from harnessing this source of power can create an economic incentive to process, filter and clean up the water. Treatment technologies for pH adjustment, removal of total dissolved solids, dissolved metal ions and variables found in mine pool water are well established.

Each mine will have its own design and optimum hydro turbine placement. In the examples shown, the turbines are placed horizontally in a first embodiment and vertically in a second embodiment. The turbine/generator may be of the double helix blade type configuration, or any other suitable turbine/generator type device.

Figure 11A:
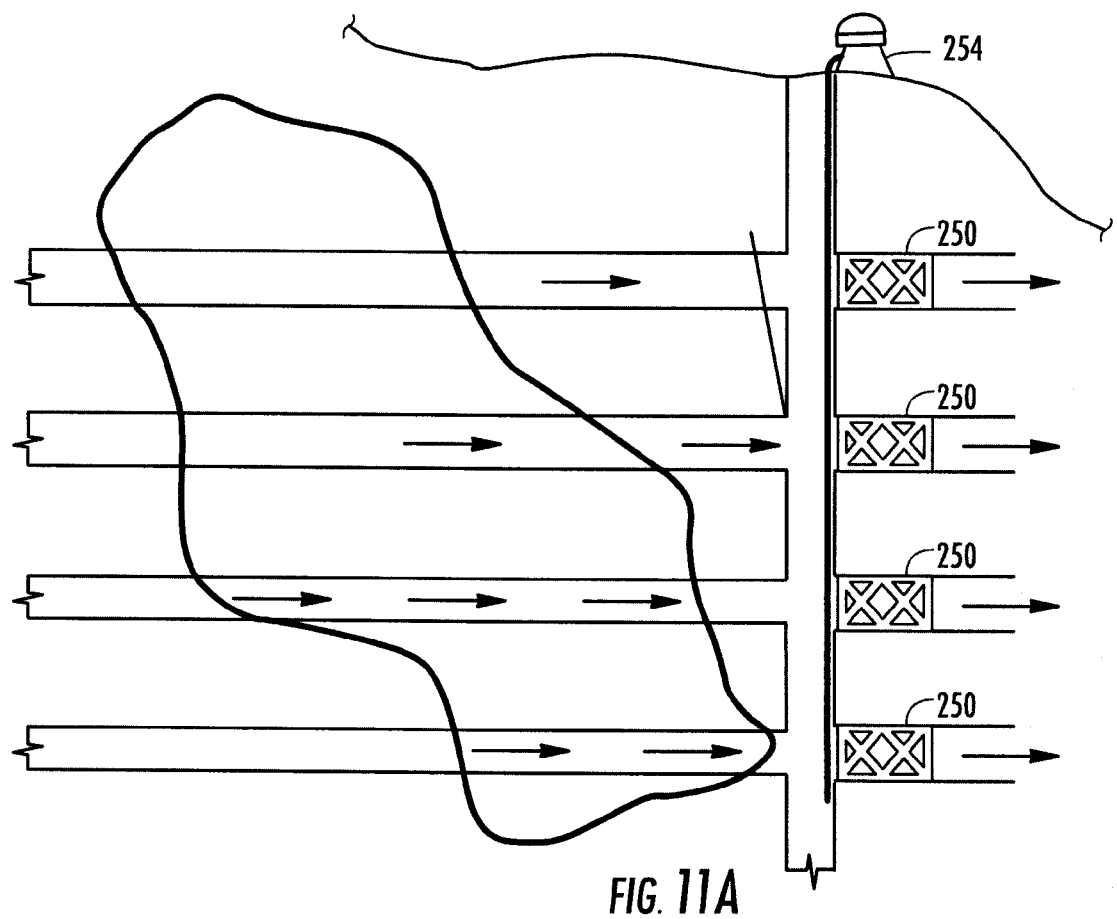
FIG. 11A is a sectional side view of a hydro-electric power generation system with horizontally oriented turbines, situated within an underground mine.

FIG. 11A represents an example of a mine having a configuration that is well suited for horizontally oriented turbine/generators 250. The water is flowing through horizontal mine shafts and caverns. The turbine/generators are likewise installed in the horizontal mine shafts and caverns. The power generated by the turbine/generators is then transmitted to electrical building 254 which contains a transformer and electrical connections to the power grid.

Figure 11B:
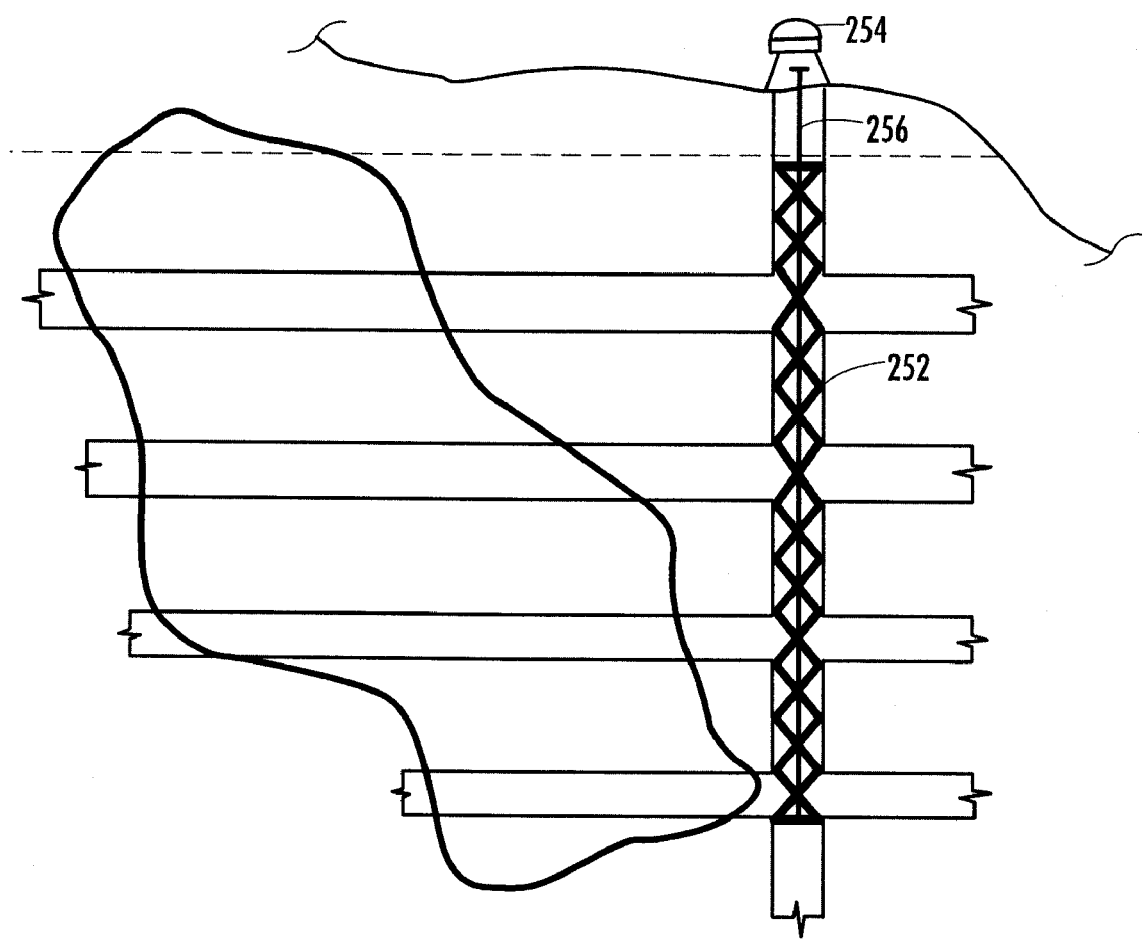
FIG. 11B is a sectional side view of a hydro-electric power generation system with vertically oriented turbines, situated within an underground mine.

FIG. 11B represents an example of a mine having a configuration that is well suited for a vertically oriented turbine. In this embodiment a plurality of turbine blade sets are bolted together to form one single elongated turbine blade. The turbine blade includes an output shaft connected to the blade sections. The output shaft is mechanically connected to a generator 256 located in electrical building 254. Electrical building 254 also contains a transformer and electrical connections to the power grid.

Another significant aspect of the underground geothermal power system is the ability to efficiently drill geothermal wells. Many of the over 500,000 underground mines in the US alone are located where geothermal activity is already know to be present. Ores such as gold, silver, uranium and copper were created as a result of geological formations and millions of years of naturally occurring pressure and geothermal heat. Many of the existing mines have vertical shafts of at least four to six feet in diameter already descending thousands of feet beneath the earth's surface. Traditional geothermal systems use two relatively small diameter pipes, one for injection of water into a geothermal reservoir and one for the return of steam used to produce energy. The amount of drilling necessary to reach a geothermal reservoir can be reduced significantly by inserting pipes down the larger vertical mine shafts and then conducting new drilling for only the remainder necessary to reach the desired geothermal reservoir.

FIG. 12A shows an above ground power plant 260 that can be more efficiently constructed above or adjacent to the vertical mineshafts, as shown. The exploration for and production from these geothermal reservoirs is facilitated by already having deep underground access to the mines. The location for new drilling in FIG. 12A is shown at 270. The pools of underground mine water may also be used as the plant's water source. Water is stored and pumped down into the well by equipment located in building 262. The pumped water descends into the earth through injection pipe 264 which in run through existing mine shaft 272 and continues through the newly drilled well site at 270 until it reaches geothermal source 266. Steam is produced in geothermal source 266 which flows up a second pipe in the newly drilled well until it reaches location 270 at which point the steam continues to flow up production pipe 268 located in mine shaft 272. The steam from production pipe 268 enters the electric steam generator in power plant 260 for the production of electricity.

Figure 12B:
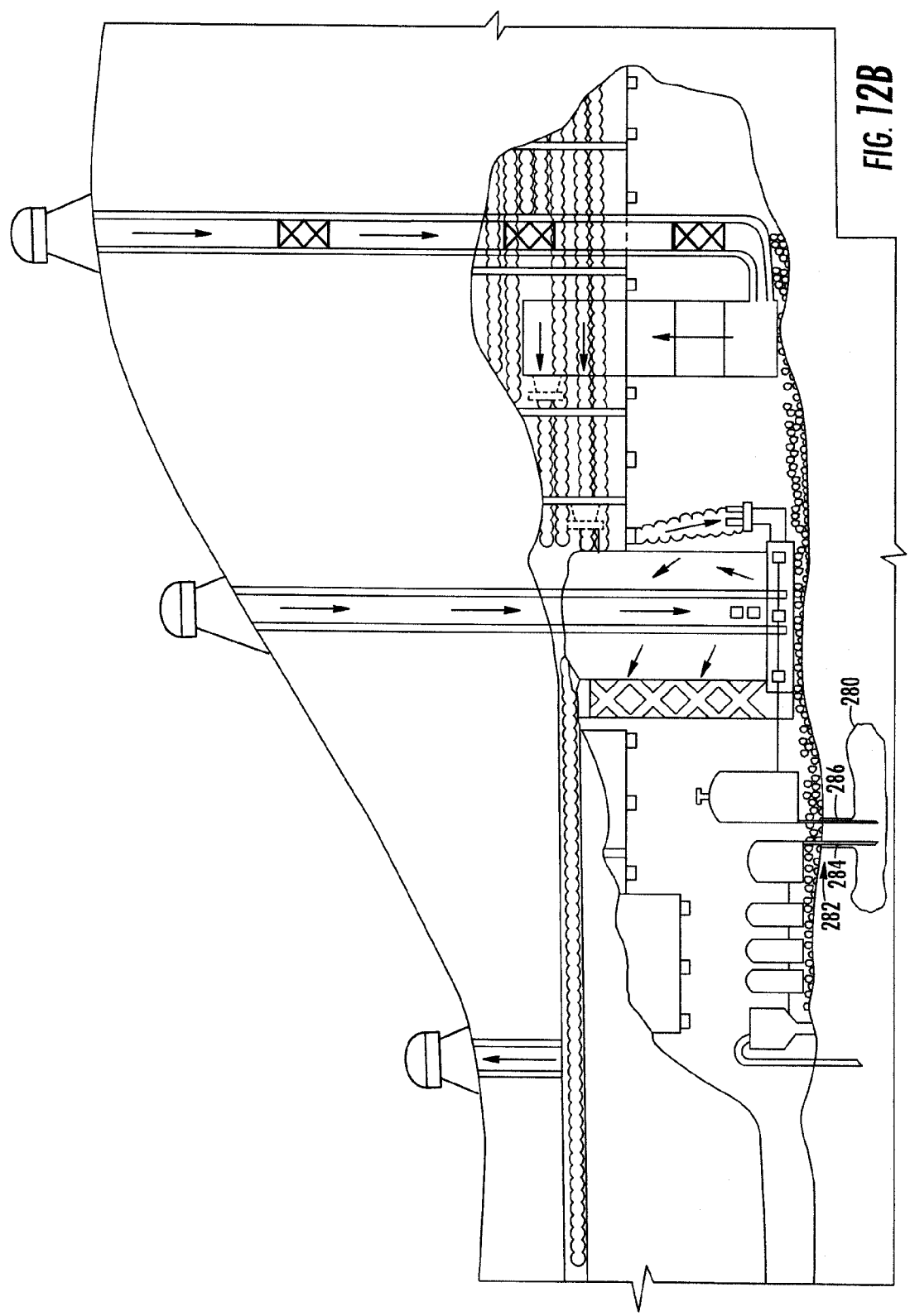
FIG. 12B is a sectional side view of a power system that includes a geothermal well within the subterranean cavern to provide a source of heat to produce steam prior to introduction into the vortex chamber.

FIG. 12B shows a geothermal power system similar to that shown in FIG. 7 with the addition of a geothermal heat source 280 to provide the source of energy for the production of steam in steam generator 170. The geothermal well 282 would provide a passageway for a water injection pipe 284 and steam production pipe 286.

FIG. 12C shows a steam powered geothermal power plant system where the steam turbines are located underground. The steam turbine/generator 290 can be configured as a single unit or in multiple banks of turbines depending upon the size of the system and space. By way of example, the steam turbine/generator 290 can be the one manufactured by UTC Power, a United Technologies Company, under the product name "Pure Cycle"®. The geothermal turbine/generator works at temperatures as low as 165 degrees Fahrenheit and can produce up to 225 KW of electricity per unit. With up to forty units interconnected the geothermal power plant has the potential of generating up to 9 MW of electrical energy per installation. The steam turbine/generators 290 can be either located in the same cavern as the rest of the system or in another cavern, or, located on the surface as shown in the embodiment of FIG. 12A. Subterranean water is treated by filtering system 150 and is introduced into injection pipe 264 which in run through the newly drilled well site at 270 until it reaches geothermal source 266. Steam is produced in geothermal source 266 which flows up a second pipe 268. The steam from production pipe 268 enters the steam turbine/generator power plant(s) 290 for the production of electricity. While the power output line 292 is shown going up a vertical mineshaft it could also be installed in a horizontal tunnel or access shaft.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A geothermal power generation system comprising:
a first air inlet located at the surface of the earth;
air entering said air inlet at an ambient temperature;
a subterranean chamber located beneath the surface of the earth;
ductwork located in said subterranean chamber;
said subterranean chamber having a naturally occurring geothermal temperature;
a first insulated conduit defining a first flow path for fluidly connecting the first air inlet to said ductwork in said subterranean chamber whereby the air entering said first air inlet passing through the ductwork is heated substantially to the geothermal temperature; and said ambient temperature is substantially cooler than said geothermal temperature;
whereby a fluid flow is induced between the air entering said first air inlet at said cooler ambient temperature, and the air passing through the ductwork that is heated to said geothermal temperature, and,
a turbine generator located in said first flow path that is powered by said induced fluid flow, said geothermal power system further including a tornado/vortex engine that includes a cyclonic chamber wherein warm air from the ductwork is introduced into a lower side wall of the cyclonic chamber at a plurality of hot air inlet ports, and, said tornado/vortex engine further including a second insulated conduit defining a second flow path for admitting cool ambient air from a second air inlet, located at the surface of the earth, to said cyclonic chamber;
said second flow path opens into the cyclonic chamber in a central location near a bottom portion of the cyclonic chamber,
whereby the warm air entering the side wall of the cyclonic chamber rises and collides with the cool ambient air entering the center of the cyclonic chamber that is descending to produce a high cyclogenesis effect.

2. The geothermal power system of claim 1, wherein a turbine chamber is positioned adjacent to and in fluid communication with the cyclonic chamber, said turbine chamber containing a vertical axis wind turbine, said turbine including blades that extend into the cyclonic chamber.

3. The geothermal power system of claim 2, wherein said vertical axis wind turbine is operatively connected to an electrical generator to generate electrical power.

4. The geothermal power system of claim 1, wherein a carbon dioxide filter is located between said first fluid passageway and said ductwork,
whereby the fluid flow will be cleansed and,
the carbon dioxide will be sequestered and stored for either residual uses or disposal.

5. The geothermal power system of claim 1, wherein said cyclonic chamber includes a baffle adjacent each of said hot air inlet ports to induce a swirling motion to the hot air entering the cyclonic chamber.

6. The geothermal power system of claim 1, wherein said cyclonic chamber includes a first and a second outlet both located in an upper portion of the chamber.

7. The geothermal power system of claim 6, wherein said first outlet directs the warm air exiting the cyclonic chamber back to said ductwork to recapture the heat remaining therein.

8. The geothermal power system of claim 7, wherein said second outlet directs the warm air via additional ductwork to other subterranean chambers.

9. The geothermal power system of claim 7, wherein said second outlet directs the warm air via additional ductwork to an exhaust outlet located at the earth's surface.

10. The geothermal power system of claim 1, wherein a substantial portion of the ductwork is mounted in an upper region of the subterranean chamber.

11. The geothermal power system of claim 10, wherein the ductwork mounted in a suspended manner from the top of the subterranean chamber.

12. The geothermal power system of claim 10, wherein the ductwork is stacked and coiled back and forth upon itself and absorbs the natural warmth of the subterranean chamber's temperature.

13. The geothermal power system of claim 10, wherein the subterranean chamber includes a plurality of suspended lighting fixtures.

14. The geothermal power system of claim 13, wherein the lighting fixtures are moveable.

15. The geothermal power system of claim 13, wherein the ductwork is positioned over suspended lighting to recapture the heat lost by the lighting fixtures.

16. The geothermal power system of claim 1, further including a steam generator for producing steam which is fluidly connected to steam jets located adjacent each of said plurality of air inlets.

17. The geothermal power system of claim 16, wherein the steam generator is fed from a subterranean water source and the water is filtered prior to entering the steam generator.

18. The geothermal power system of claim 17, wherein the source of energy for converting the water to steam is a geothermal heat source.

19. The geothermal power system of claim 1, further including an underground farm used to grow plants wherein the electrical energy produced by the power system will produce the necessary power for pumps, lighting and other machinery.

20. The geothermal power system of claim 4, further including an underground farm used to grow plants wherein the carbon dioxide that is stored is used to improve the plant's photosynthesis process thereby providing more clean oxygen to the environment as a byproduct of the underground farm.

21. The geothermal power system of claim 1, further including an underground farm used to grow plants wherein subterranean water is used, said subterranean water is treated to remove most toxic or undesirable chemicals.

22. The geothermal power system of claim 21, wherein the plant grown is a strain of algae that is capable of absorbing acid and heavy metals from the subterranean water.

23. The geothermal power system of claim 1, further including an underground farm used to grow plants wherein the plant grown is a source of renewable biomass material that can be burnt or composted to produce more energy and or used as a fertilizer.

24. The geothermal power system of claim 1, further including additional subterranean chambers that include sources of flowing water thereby producing a water current, and, a turbine generator placed in the path of said flowing water to produce electrical energy.

25. The geothermal power system of claim 24, wherein said turbine has an axis that is oriented in a vertical direction.

26. The geothermal power system of claim 24, wherein said turbine has an axis that is oriented in a horizontal direction.

27. The geothermal power system of claim 1, further including a geothermal well located within another subterranean chamber.

28. The geothermal power system of claim 27, wherein said geothermal well includes a water injection pipe and a steam production pipe, said well water injection pipe and said well steam production pipe are connected to a steam powered electrical generator located at the surface of the earth by connecting pipes that rise from said another subterranean chamber through vertical manmade or natural passageways.

* * * * *